United States Patent [19]
Duffy

[11] Patent Number: 6,019,070
[45] Date of Patent: Feb. 1, 2000

[54] CIRCUIT ASSEMBLY FOR ONCE-THROUGH STEAM GENERATORS

[76] Inventor: Thomas E. Duffy, 2226 Illion St., San Diego, Calif. 92110-2341

[21] Appl. No.: 09/204,578

[22] Filed: Dec. 3, 1998

[51] Int. Cl.[7] .................................................. F22B 23/00
[52] U.S. Cl. ...................................... 122/209.1; 122/7 R
[58] Field of Search .................................... 122/1 R, 7 R, 122/209.1, 214, 223, 224, 225, 226, 451 S; 60/39.182

[56] References Cited

U.S. PATENT DOCUMENTS

| | | | |
|---|---|---|---|
| 3,515,101 | 6/1970 | Hambleton | 122/365 |
| 4,627,386 | 12/1986 | Duffy | 122/510 |
| 4,989,405 | 2/1991 | Duffy | 60/39.182 |
| 5,237,816 | 8/1993 | Duffy | 60/39.182 |

FOREIGN PATENT DOCUMENTS 1235235  4/1988  Canada .

OTHER PUBLICATIONS

SR94–R–5527–101 Duffy, 1500° F. Steam Plant for Industrial Cogen. Proto Type Development Test pp. 27 Through 45, 1996.

*Primary Examiner*—Tu Ba Hoang
*Assistant Examiner*—Jiping Lu

[57] ABSTRACT

A once-through steam generator or boiler of simple modular construction that utilizes vertical heat transfer tubes, intended primarily for heat recovery in combined cycles. It utilizes a novel method of assembly and operation that make it particularly effective for large combined cycles. Circuit assemblies with a once-through flow path are the key building blocks used to assemble boilers to fit any size gas turbine. They are individually bench fabricated in a horizontal plane. The boiler is manufactured by sequentially stacking individual circuit assemblies in parallel thereby building a circuit module. During the stacking process the inlet and outlet of each circuit assembly are connected to headers to allow the modules to be erected into a heat transfer bundle. For large boilers several transportable circuit modules are interconnected in the field to complete a once-through boiler. Through the use of jumper tubes and a novel maintenance space integrated in the boiler, interconnection of modules in the field is simplified at installation and repair made easy. A novel method of dewatering and drying vertical tube boilers is incorporated. The dewatering method uses stored energy to reverse the flow of water and steam in the boiler thus forcing water out of the tubes. This operating method is important in preventing corrosion of carbon steel tubes, thereby permitting the practical application of carbon steel tubes to vertical tube once-through steam generators.

14 Claims, 18 Drawing Sheets

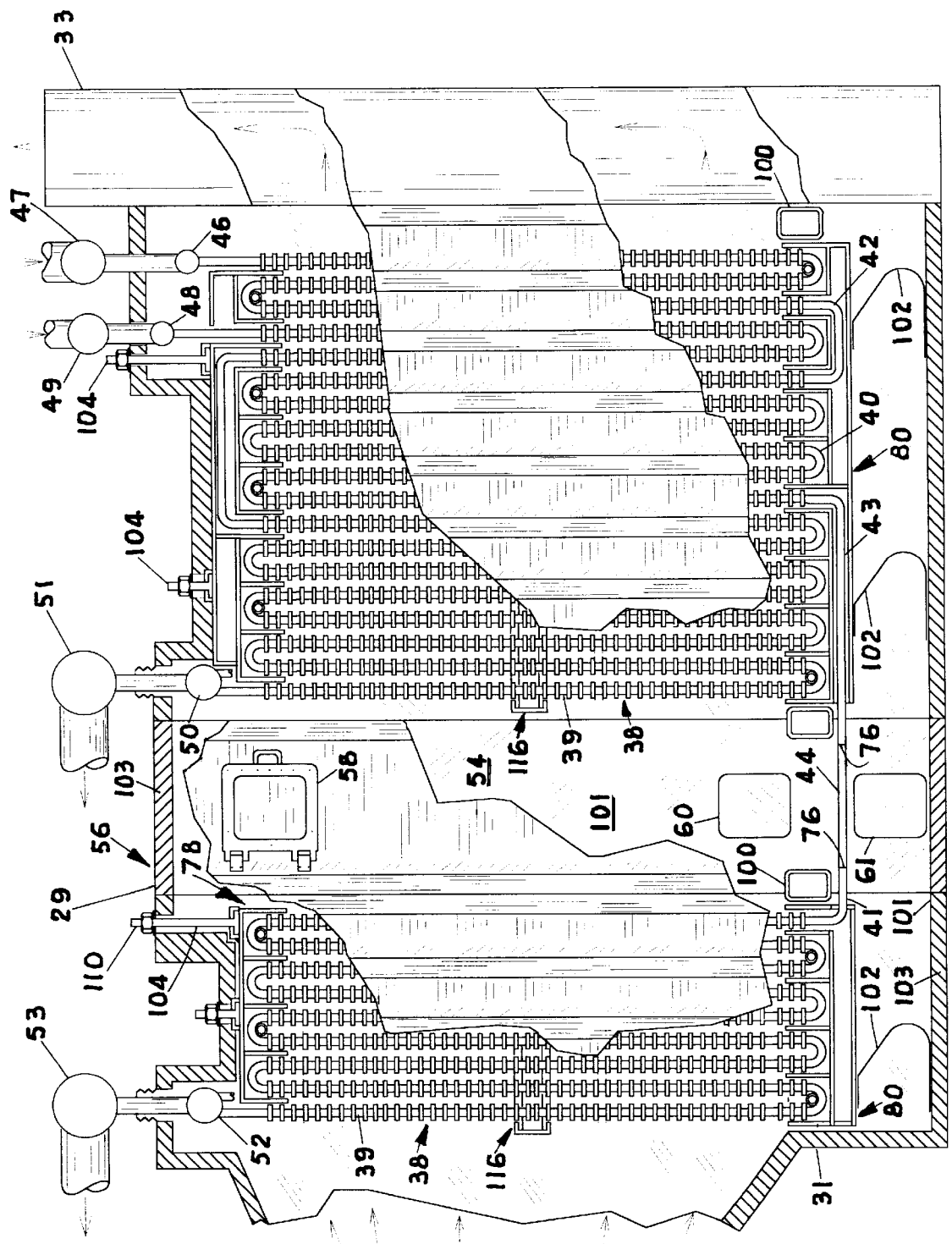

CIRCUIT ASSEMBLY FOR ONCE-THROUGH STEAM GENERATORS

TECHNICAL FIELD OF THE INVENTION

The present invention relates to steam generators (or boilers) and, more particularly, to novel improved steam generators of the once-through type.

The novel once-through steam generators, disclosed herein, are intended primarily for combined cycle power plants; and the principles of the present invention will be developed primarily by reference to that application. This is, nevertheless, being done for convenience and clarity and is not intended to limit the scope of the invention as defined in the appended claims.

A combined cycle plant is one in which thermal energy is contained in the exhaust of a gas turbine and is recovered and converted to mechanical energy by using those gases to generate steam as the motive power for a steam turbine. In a similar process, the invention can also convert waste exhaust gases to useful thermal energy, as in cogeneration process fluids.

BACKGROUND OF THE INVENTION

In central utility power plants, once-through steam generators have been extensively used, particularly for large, coal fueled boilers with supercritical steam conditions. These are field erected and built around a vertical radiation section. They typically use membrane tube walls in the radiant section and bare tubes in most of the convective sections. Their cost per unit of heat transfer surface is very high. Combined cycle heat recovery boilers are primarily natural or forced recirculation boilers requiring large steam drums. Virtually all heat recovery boilers, used in combined cycles, employ finned tube heat transfer surfaces arranged in compact convective heat transfer bundles. Most of the large boilers use vertical heat transfer tubes with horizontal gas flow. Large combined cycles typically use thousands of finned tubes from 40 to 60 feet long.

Once-through steam generators, based on innovations recently patented, are now being installed on small combined cycles (5 to 50 MW gas turbines). These small boilers have earned acceptance as the simplest method of implementing the efficient combined cycle into power generation and cogeneration. More than thirty are now in operation. These once-through heat recovery boilers have many circuits of horizontal tubes connected at the feedwater inlet and steam outlet. Water is distributed uniformly into each circuit by an orifice at the inlet of each circuit. As water flows through the horizontal heat transfer tubes it is heated, evaporated and superheated by the turbine exhaust gases flowing vertically up on the finned exterior of the tubes. No water side interconnection is made until the end of each circuit. Each circuit is connected at its end to a steam header that collects steam for distribution to the turbine. Good operational success has been obtained in these installations. The once-through steam generators are the simplest means of recovering waste heat from exhaust gases. They eliminate drums, downcomers, blowdown, boiler water chemical treatment, boiler make-up water, level controls, many valves, and numerous mechanical penetrations of the pressure containment envelope. The once-through boiler can also operate dry, has the highest transient response, reduces make-up water requirements and can be operated unattended.

Due to the numerous advantages they provide, it could be expected that the majority of boilers ordered would be of the once-through type. However, several disadvantages of horizontal tube configurations have limited once-through boilers to small and medium size turbines. More than ninety percent of the operating once-through boilers use an expensive high nickel stainless steel (alloy 800) in their tubing. All once-through steam generators in combined cycle service are horizontal tube configurations to provide drainability to dewater the tubing for freeze and corrosion protection. Several boilers in steam injected gas turbine applications are constructed with only a few rows of vertical tubing. The vertical tube steam injection boilers are in tropical sites and a high nickel stainless steel tubing is used to prevent corrosion. For large gas turbines, boiler tube bundles can weigh more than two million pounds. Thermal expansion during transients requires the tubes to expand several inches. Horizontal tubes, supported by conventional tube sheets, have high sliding frictional forces that place high bending loads on tube sheets and buckling loads on the tubes. To obtain sufficient strength many thick tube sheets are required with resulting high cost. Conventional U-bend end seals to stop blowby losses are further complicated by the greater expansion of long horizontal tubes. This sealing arrangement is expensive and of limited effectiveness where added cross-over tubes are required for triple pressure boilers. Since most large combined cycle boilers have at least triple pressure levels this sealing problem is an important performance consideration.

All the operating once-through boilers have limited capability to accept high supplemental firing temperatures between the gas turbine and the boiler. This limitation is a consequence of the horizontal tube configuration in which the structural support must operate at gas temperatures. As a result, they can only operate to an inlet gas temperature of about 1500° F., even if stainless steel tube sheets are used in their construction. Since the majority of cogeneration applications use supplemental heating, this is a significant limitation.

The above limitations and problems are resolved in practice by using vertical tube natural circulation boilers for large combined cycles. In these natural circulation boilers have self supporting vertical carbon steel tubes cooled by steam or water. The major structure does not operate at gas temperature and the tube weight is directly supported by the tubes. These advantages for large combined cycles have generally made the vertical tube natural circulation boiler the most cost effective approach and most commonly selected.

The novel vertical tube once-through boilers, disclosed herein, are a combination of the above technologies in which the advantages of both types of boiler would be realized. However, before a large vertical tube once-through steam generator becomes practical innovations in the structural, manufacturing, dewatering, materials, operations and maintainability areas must be achieved.

The conventional natural circulation boiler dewaters its vertical tubes by interconnecting every bank of two tube rows with a lower header that has its own drain valve that simultaneously drains two banks of tubes. Lower headers, connecting all of the tube banks, allow a natural circulation boiler to be drained with only about a dozen drain lines. However, vertical tube once-through boilers cannot be economically drained with conventional drain lines and valves. An individual once-through circuit must be kept completely separate from its adjacent circuits. To drain a circuit each lower U-bend tube would need to have its own drain line and valve. Thus, if conventional drains were incorporated, thousands of drain lines and valves would be necessary at the bottom of each U-bend. As a result, all heat recovery once-through boilers in a freezing climate utilize horizontal tubes to be self draining.

Since vertical tube once-through boilers are not practical to drain by gravity, other dewatering methods are necessary. The simplest method is to shut the feedwater flow to completely dry the boiler by evaporating all the water with the turbine exhaust gases prior to scheduled shutdown. Dry operation is an effective method to dewater, and horizontal tube once-through boilers use it to assist in dewatering. However, dry operation to dewater requires the gas turbine to be operational. Thus a back-up system is necessary in case the gas turbine fails.

For large gas turbines, with the exhaust temperatures as high 1200° F., the conventional design of horizontal tube boilers requires numerous thick tube sheet supports and relatively large diameter tubes to prevent tube buckling. The costs are high, particularly for large gas turbines in the 100 to 300 MW size. The high nickel stainless steel tubes, used in conventional once-through boilers, are very expensive relative to the carbon steel tubes used in conventional drum boilers. Both cost and design complexity increase with increasing boiler size. Thus, conventional once-through boilers using high nickel stainless steel tubes, horizontal tubes, and tube sheet construction are limited in application to smaller gas turbines. However, large gas turbines constitute the majority of power generation being installed (based on total MW's). The initial cost of conventional large once-through boilers is the primary problem. To match large combined cycle requirements, and solve the cost problem, an innovative carbon steel once-through boiler with vertical tubes and novel operating methods is necessary and described herein.

DISCLOSURE OF THE INVENTION

There are disclosed herein new and novel boilers in which the foregoing problems and disadvantages of horizontal tube once-through boilers are eliminated, but the basic benefits of the once-through boiler are retained. The boilers disclosed herein have novel components, arrangements and construction features; these reduce initial costs, simplify vertical tube installation, reduce gas blowby and make every tube and weld joint completely accessible in field repair. A means of dewatering and drying the vertical tube boiler is included to prevent freeze damage and corrosion. This permits the practical use of carbon steel tubes. The boiler is comprised of self supporting vertical tubes that can be made of any boiler code material. Thus, it has a capability to operate at high gas temperature while eliminating expensive tube sheets and achieving substantial reductions in tube material costs. In addition, factory labor hours are reduced and field repair is simplified by the invention compared to conventional once-through and natural circulation boilers.

Construction is greatly simplified by the invention wherein each circuit is assembled separately using horizontal bench construction techniques. A novel means of fabrication, support, and spacing of each circuit assembly is a vital element of the invention. Circuit assemblies are stacked in parallel in the shop with headers and boiler casing components connected make a circuit module. The circuit module is transported to the power plant site for erection. A novel means of interconnecting and structurally integrating the circuit module after erection is an important feature of the boiler. This results in low cost manufacturing, easy transportation to the field site, fast erection and low cost interconnection of the circuit module into a completed boiler.

The circuit module support system minimizes loads and mechanical stresses on pressure containing tubes and headers. The invention results in totally independent suspension of all tubes within each circuit. Each tube and every circuit is completely free to expand and contract without frictional constraint imposed by the support structure. Both the tube support and circuit support systems are fully adjustable to uniformly weight loads. In addition, this adjustment feature eliminates stresses caused by manufacturing tolerances and reduces blowby gas losses.

Another important advantage of the boiler is the novel arrangement of the circuit module. It allows much larger tubes to be incorporated in the superheater and reheater sections. Larger diameter tubes in these sections reduce pressure losses and improve overall performance. Small diameter tubes are used in the other boiler sections to optimize performance in the water wetted tubes.

Still another feature of the invention is the unique sealing arrangement that reduces gas blowby losses. These sealing arrangements are particularly effective for large multiple pressure, once-through steam generators. Large once-through boilers characteristically require many cross-over tubes. These tubes at the top and bottom of the circuit are difficult to seal with conventional designs. This is especially a problem in large boilers where thermal expansion is several inches. Reducing gas blowby around the thousands of U-bend tubes and cross-over tubes results in higher performance with important economic benefits. Each different pressure level can be sealed against blowby losses while being interspersed in the ideal heat transfer configuration.

A novel means of dewatering the boiler is provided in case of a forced shutdown of the gas turbine. This dewatering system is an important back-up to the normal dry operation of the boiler for dewatering and drying. The novel dewatering system not only protects against freezing, but will prevent corrosion. Although dewatering prevents freezing, drying is vital to prevent corrosion of carbon steel tubes. The dewatering system uses steam pressure and residual thermal energy to completely dewater and dry the boiler. It uses energy stored in the boiler to reverse the flow and force water out the feedwater headers, thus force-draining the tubes. As a consequence of this novel drying system, the use of carbon steel tubes becomes practical with vertical once-through boilers.

The simple construction makes the boiler ideal for large combined cycles. Since long heavy tubes don't have to be manually threaded through many tube sheets, large boiler construction productivity is greatly improved with the invention.

When constructed with carbon steel tubes, the simple modular construction of the novel boiler allows it to become the lowest cost steam generator. Its cost, compared to natural circulation vertical tube carbon steel boilers, is lower since it has about the same heat transfer bundle area but eliminates drums and many valves, lines, and components associated with drums and natural circulation. When combined with high operating flexibility, low stress, simplified operation, and low corrosion, it will provide additional life cycle cost savings.

PRIOR ART

A number of once-through boilers for combined cycles have heretofore been designed as shown by U.S. Pat. Nos. 4,627,386 issued Dec. 9, 1986 to Duffy et. al; 4,998,405 issued Feb. 5, 1991 to Duffy et. al; and 5,237,816 issued Aug. 24, 1993 to Duffy et. al; and Canadian Patent No.

1235235 issued to Duffy. However, these patents are primarily applicable to small gas turbines. Horizontal seven foot long tubes made of high nickel tubes are described in the patents. Once-through boilers based on these patents, have been installed in combined cycle applications with tube lengths of forty feet, all have horizontal tube configurations. The large majority of once-through horizontal tube boilers in operation use high nickel stainless steel tubes, however, two are operating with carbon steel tubes. They all have the problems described above when applying them to large gas turbines or, supplementary firing to high temperatures.

Small, lightweight, vertical tube single pressure boilers, with only a few rows of tubing, have been installed on medium sized steam injected gas turbines. They are installed in a non-freezing climate and constructed with high nickel stainless steel. They are of a construction unsuitable and uneconomical for use in large combined cycle boilers that are thirty times heavier.

A small prototype vertical tube once-through steam generator (Duffy et al., "High Performance Steam Developments" DOE CONTRACT DE-AC02-87CD40812, FINAL REPORT PHASE III, Final Report Number SR-94-R-5527-101, January 1996) has demonstrated the operation of a vertical tube boiler at 2500° F. gas inlet temperatures. However, it was matched to a 4 MW gas turbine, and thus its mechanical design is unsuitable for combined cycles sixty times the size tested. Additionally, the prototype tested could not incorporate practical cost reducing materials and cost effective manufacturing features. Its main purpose was to research materials and arrangements to demonstrate operation at the steam temperature of 1500° F. and 1500 psia with the maximum possible firing temperature consistent with ultra-low emissions. As a consequence, it did not incorporate materials, construction and maintenance features necessary for commercial applications.

Prior art of once-through boilers has not been applied to large combined cycles. If the prior art were applied the problems and limitations, discussed above would apply.

Large, horizontal tube natural and forced circulation boilers have been installed with large gas turbine engines. They use massive construction methods with thick tube sheets, large diameter tubes, and many support beams in the hot gas path that increase costs. They also do not have the many advantages inherent in once-through boilers.

One of the novel features of the invention, disclosed herein, is a circuit assembly that is the basic building block of the vertical tube once-through boiler. U.S. Pat. No. 3,515,101 issued Jun. 2, 1970, to Hambleton for WELDED HEADER AND TUBE ASSEMBLY FOR STEAM GENERATORS described a tube to header weld joint assembly. This assembly is extensively used as the building block in the construction of hundreds of vertical tube large natural circulation boilers for gas turbine heat recovery. This weld assembly made possible a cost effective tube bank assembly of two rows of tubing that can be interconnected to other banks of tubes and other components such as drums to complete a steam generator. It also provides a simple low cost means of draining vertical tube banks. However, in no case is the Hambleton invention comparable to those invented and disclosed herein.

The Hambleton tube bank assembly is totally incompatible with once-through steam generation. It interconnects adjacent heat transfer tubes in a row together with a header at top and bottom. The header has space to weld two rows. The two rows of tubes assemble into a bank aligned perpendicular to the gas flow. Water or steam flow is vertically up or down across the flow of gas. Water is interconnected between all the tubes in a row (to form a bank of tubes) at the top and bottom headers. The headers are connected to other similar tube banks to establish counter flow required in the economizer and superheater sections of natural circulation boilers. This assembly has proven to be successful in hundreds of natural circulation boilers operating around the world. Once-through boilers cannot properly function if tubes in adjacent circuits are connected together in the tube bundle at any position other than at in the inlet and outlet headers. In it water must flow from inlet tube row through dozens of rows in each individual circuit. For proper stability and temperature control It is vital that all of the flow metered into a given circuit remains in the circuit until it is superheated steam. Thus, it can be concluded, that the Hambleton tube assembly that interconnects every row in each circuit is opposite to what is required in a once-through boiler. However, the circuit assembly invention disclosed herein could be applied advantageously in the superheater section of vertical natural circulation boilers. By replacing the Hambleton assembly (that completes a bank of two tube rows), with the invention described herein, many of the differential thermal stresses between tubes in a row are eliminated. These stresses result from the Hambleton design that rigidly connects two adjacent rows of tubes by means of a stiff header. Since long superheater tubes can be at significantly different temperatures across a bank of tubes in a row, the rigid connection with large differential tube expansion can result in distortion or fatigue failure. The invention herein disclosed has every row completely independent and allows freedom of rotation around the row-to-row U-bend tube connection. Thus the transverse strain along the length of the header is eliminated, and the row-to-row strain is minimized by the invention.

OBJECTS AND ADVANTAGES

From the foregoing it will be apparent to the reader that the primary objective of the present invention resides in the provision of novel, improved boilers of the once-through type based on construction from novel individual circuit assemblies.

Other, also important but more specific, objects of the invention reside in the provision of boilers:

which can have the low initial cost;

which have high thermal energy recovery performance;

which can use carbon steel and all other code approved boiler tube metals in vertical once-through boilers;

which can be operated in the exhaust of the largest gas turbines with high temperature supplementary firing;

which can be fabricated from many individual circuit assemblies that can be independently stacked horizontally into a boiler circuit module;

which can be easily subdivided into transportable circuit modules that can be cost effectively shipped to sites for installation;

which can be simply erected and interconnected into a complete boiler from circuit modules on site in a short period of time using;

which can be repaired in the field without the need to cut through other adjacent heat transfer tubes or the boiler casing;

which can provide complete 360 degrees access to all heat transfer tubes, weld joints, and internal supporting structure in the field to permit machine welding to repair or replace tubes or repair structure;

which can minimize gas side blowby losses;

which can eliminate the need for tube sheets;

which can eliminate the cumulative friction loads that horizontal tubes impose on tube sheets or other support structure;

which can minimize tube mechanical stresses during operation by a cost effective means for locating and adjusting the U-bend tube support during manufacturing;

which can use the circuit assembly support structure as the primary manufacturing fixture;

which can use the circuit assembly support as the primary structure in transportation to the field;

which can allow the individual circuit assemblies to be bench fabricated in a horizontal plane or in a vertical plane with tubes installed horizontally from one side;

which can permit large changes in heat transfer tube diameters within circuits to optimize performance;

which can be economically subdivided between circuit modules to provide space within the gas flow path to accommodate commercially available emissions reduction equipment;

which can be operated dry;

which can be simply dewatered and dried to prevent freezing and corrosion after forced shutdowns of the gas turbine;

which can operate with standard all volatile feedwater treatment;

which have a boiler tube support structure that is outside the high velocity gas flow path, and that such support structure can be cooled by the U-bend tubes and adjacent heat transfer tubes;

which do not require side seals on the heat transfer bundle;

which have access to all flexible gas seals for inspection and replacement;

which can eliminate stresses caused by excessive restraint on the U-bend tubes in adjacent rows of superheater tubes; and which can be rapidly started up and shut down.

Further objects and advantages of my invention will become apparent from consideration of the drawings and ensuing description.

DRAWING FIGURES

In the drawings:

FIG. 3 is an elevation view of the dual pressure boiler with a portion of the side casing removed to show internal arrangement of the upper and lower circuit assembly struts, the hanger rods, the upper casing overhead structure and the tube mid-span spacer assembly;

Figure 1:
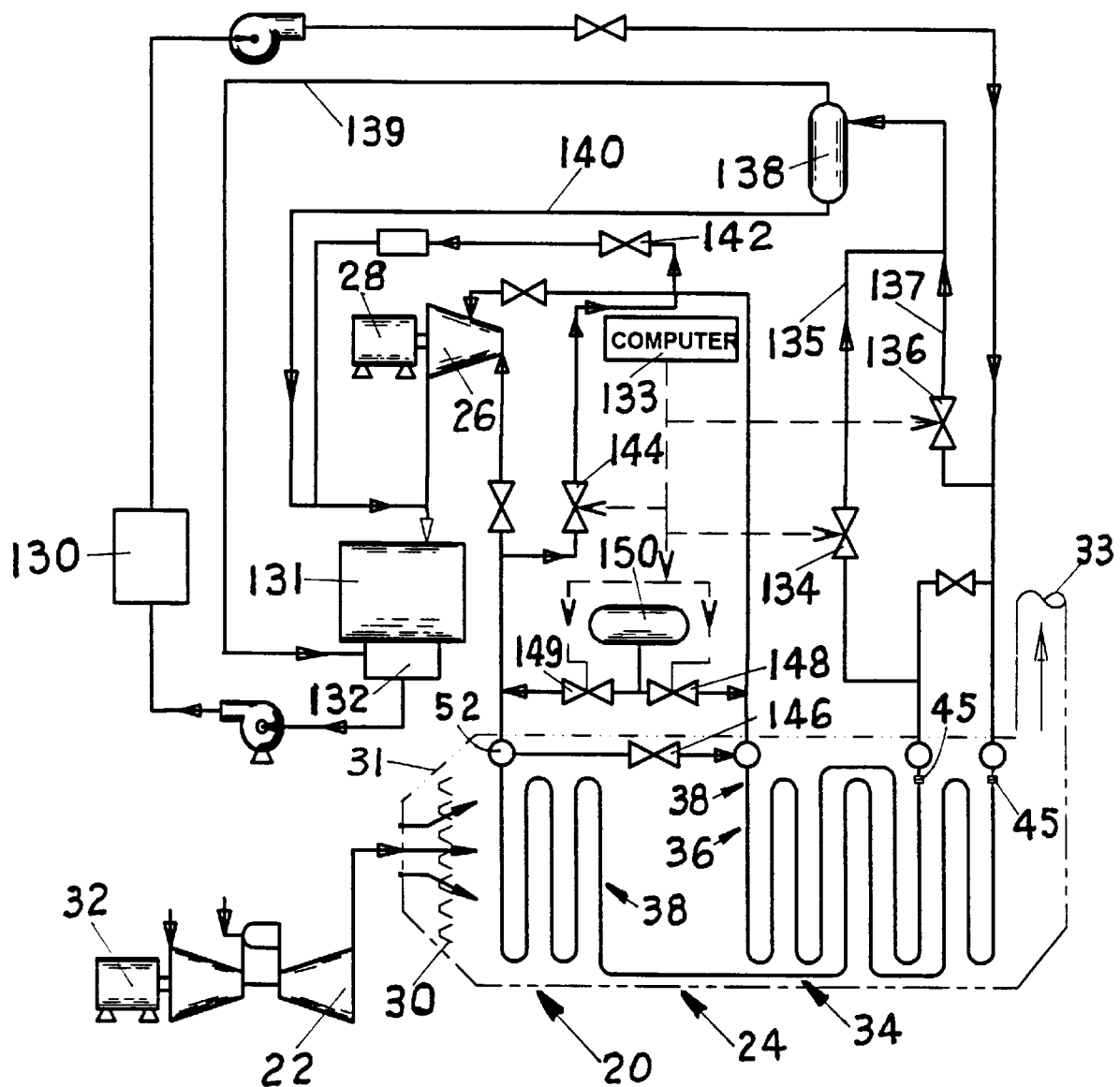
FIG. 1 is a schematic arrangement of a dual pressure once-through boiler integrated with its dewatering system in a combined cycle application.

REFERENCE NUMERALS IN DRAWINGS 20 combined cycle power plant
22 gas turbine
24 once-through boiler including heat transfer bundle 34, boiler casing 56, and external manifolds for steam and water
26 steam turbine
28 steam turbine alternator
29 gastight shell structure
30 supplemental duct burner
31 boiler inlet gas duct
32 gas turbine alternator
33 boiler exhaust stack
34 complete heat transfer bundle assembly including modules 36, jumper tubes 44 and 64
35 circuit sub-module includes feedwater headers 48, 50, and 52, and many parallel circuit assemblies 38
36 circuit module includes circuit module sub-assembly 35, and adjacent sections of boiler casing gastight shell structure 29
38 circuit assembly includes heat transfer tubes 39, U-bend tubes 40, cross-over tubes 42, jumper-lead tubes 43, orifice 45, upper strut 78; lower strut 80, and mid-span spacer assemblies 116
39 heat transfer tube
40 U-bend tube
41 elbow tube 42 cross-over tube
43 jumper-lead tube
44 jumper tube
45 flow restriction
46 high pressure feedwater header
47 high pressure feedwater exterior manifold
48 intermediate pressure feedwater header
49 intermediate pressure feedwater exterior manifold
50 intermediate pressure steam header
51 intermediate pressure steam exterior manifold
52 high pressure steam header
53 high pressure steam exterior manifold
54 maintenance space
56 boiler casing including gastight shell structure 29, stack 33, inlet gas duct 31, maintenance space 54, hanger rods 104, insulation 103 and liners 101
58 upper maintenance hatch
60 lower maintenance hatch
61 below jumper tubes maintenance hatch
62 low pressure feedwater exterior manifold
63 low pressure feedwater header
64 offset jumper tube
65 low pressure steam header
66 low pressure steam exterior manifold
68 reheat steam inlet header
69 reheat steam inlet exterior manifold
70 reheat steam outlet header
71 reheat steam outlet exterior manifold
76 circuit assembly connection weld joint
78 upper strut including structural section 82, U-bend support bracket assembly 90, split seal 98, partition walls 86, 88 and 89 and hanger slotted block 108
80 lower strut including structural section 82, U-bend support bracket 90, U-bend contoured restraint 96, split seal 98, partition walls 86, 88 and 89
82 strut structural section
83 reinforcement
86 U-bend tube partition wall
88 cross-over tube partition wall
89 U-bend extra seal partition
90 U-bend support bracket assembly including base plate 94 and U-bend support saddle 92 and contoured restraint 96
92 U-bend support saddle
94 base plate
96 U-bend contoured restraint
98 split tube seal-support collar
100 boiler seismic beam
101 boiler casing inner liner plate
102 blowby seal
103 insulation system
104 hanger rod
105 removable spacer
106 flange
107 Vee-groove
108 hanger slotted block
110 threaded connection
111 adjustment nut
114 guide plate
116 tube mid-span spacer assembly including spacer bars 118, row spacers 120, attachment clamps 122, attachment connection 123 and transverse structural beam 124
118 spacer bar
120 row spacer
122 attachment clamp
123 attachment connection
124 transverse structural beam
130 full flow demineralizer polishing system
131 power plant condenser
132 condenser hotwell
133 system control computer
134 intermediate pressure reverse flow valve
135 intermediate pressure reverse flow piping system
136 high pressure reverse flow valve
137 high pressure reverse flow piping system
138 steam separator
140 drain to hotwell
139 steam from separator piping system
142 intermediate pressure steam turbine by-pass valve
144 high pressure steam turbine bypass valve
146 cross-over valve
148 intermediate pressure gas valve
149 high pressure gas valve
150 dry gas source

SUMMARY

This invention relates to once-through boilers constructed from novel individual circuit assemblies that makes vertical tube once-through boilers practical for use in combined cycles. Corrosion prevention and freeze protection are derived through the novel operating method that dries the boiler during shutdowns, even if the gas turbine fails. As a consequence of keeping the boiler dry when not operating, carbon steel and low alloy steels can be used. When constructed with carbon steel tubes, the boiler will have lower initial cost than all once-through or natural circulation boilers used in combined cycles. Other major advantages include: more than ninety percent of pressure part welding is done in shop bench assemblies; a method of horizontal welding of circuit assemblies into transportable circuit modules; a simplified field erection method that allows machine welding to interconnect circuit modules; and a repair method that is simplified by a novel maintenance space. These advantages and others contribute to higher reliability, greater operating flexibility and lower cost.

This invention allows the many operating advantages of the once-through steam generator to be economically available to the largest combined cycle plants.

DESCRIPTION OF BEST MODES OF CARRYING OUT THE INVENTION

DESCRIPTION OF SYSTEM

FIG. 1 depicts a combined cycle power plant 20 constructed in accordance with and embodying the principles of the present invention. For the most part, the components of this system are of conventional or otherwise familiar construction. Those components will be described herein only to the extent necessary for an understanding of the present invention.

The major components of a combined cycle power plant 20 include, a gas turbine 22 and a once-through boiler 24 that embody the principles of the present invention. Steam is generated by thermal energy from the hot gases exhausted from gas turbine engine 22 into a boiler inlet gas duct 31. A steam turbine 26 connected to drive a steam turbine alternator 28, and employing the steam generated in the boiler 24 as a motive fluid, is the other major part of the power plant. The gas turbine drives an exemplary load, a gas turbine alternator 32. After transferring heat to the steam in boiler 24 the cooled gases are discharged to the atmosphere through a boiler exhaust stack 33.

In power plant 20, the gas turbine 22 can be replaced with other engine types, fuel cells or other heat sources that can utilize a tubular convective heat transfer bundle to recover heat in the form of steam. Supplementary firing of the gas turbine exhaust in a supplemental duct burner 30 is used in some combined cycles upstream of boiler 24 to increase power and improve flexibility. Small combined cycles commonly use supplemental burners, but reliability problems limit this option in large boilers. The novel boilers disclosed herein make high temperature supplemental burners a more reliable option for large boilers. The use of supplementary firing can expand the novel boiler herein described to include supercritical steam plant applications for repowering and high performance projects.

In power plant 20, steam turbine 26 drives alternator 28. However, it can drive a different type load than the gas turbine engine or, both can be arranged to drive a common load, such as an alternator or a compressor.

In a variation of the system, shown in FIG. 1, the steam, exhausting from steam turbine 26, can be at higher pressure and be directed to a cogeneration process. In another variation, the steam from steam turbine 26 can be at a sufficiently elevated pressure to be directly introduced into gas turbine 24. Steam injected into the gas turbine increases power, reduces emissions, and can also be used to cool critical turbine components.

Another variation would use an extraction steam turbine to provide even more flexible use of the steam generated in boiler 24.

In another means of recovering waste energy from gas turbine engines, all the steam from boiler 24 can be initially produced at temperatures and pressures required by industrial or commercial processes. This variant eliminates the steam turbine, and is particularly effective if power is not required. The novel features of the boiler, herein disclosed, make these cycles of heat recovery practical to many more power plants.

DESCRIPTION OF A DUAL PRESSURE BOILER

FIG. 1 schematically illustrates the dual pressure boiler 24. It has high pressure boiler tubes interspersed with intermediate pressure boiler tubes. A high pressure steam header 52 is at left of boiler 24 schematic. A intermediate pressure steam header 50 is in the middle of 24 in this schematic. This system is typical of combined cycles below about 100 MW. In cogeneration systems or certain other applications, steam could be directly taken from the intermediate pressure system or a low pressure saturated steam boiler could be integrated with boiler 24. For larger combined cycles, three pressure levels plus reheat are common. However, FIG. 1 is illustrative of how multiple pressures are integrated by interspersing rows of tubing to efficiently recover heat from gas turbines. Triple or quadruple pressure boilers are arranged in a similar manner as illustrated in FIG. 1. Process fluids, such as high pressure hot water, are also integrated in the same interspersed arrangement of heat transfer tubes as described herein. The boiler is particularly suitable for many pressure levels using the same novel features of construction and operation. Multiple pressure levels are used to extract the maximum amount of heat from the exhaust by utilizing one or more lower pressure sections. The exhaust gas from the gas turbine flows from the boiler inlet gas duct 31 at the superheater steam end of the boiler, then through the heat transfer section of the boiler that is surrounded by a gastight shell structure 29 and exits the tube bundle at the feedwater end into the boiler exhaust stack 33. The combined cycle system feedwater pump forces water into the inlet of each circuit effecting a flow of water into many parallel circuits wherein it is evaporated and superheated in one long continuous serpentine flow path. Feedwater is normally demineralized by passing it through a full flow demineriliizer polishing system 130 (FIG. 1). By arranging the position of different steam pressure generating circuits the pinch points are progressively lower in temperature as the gas cools in its passage through the boiler. This results in lower exhaust gas stack temperatures and therefore greater waste heat recovery. The novel vertical tube once-through boiler allows the use of more pressure levels than are economically possible with conventional boilers. Conventional drum natural circulation boilers or horizontal tube once-through boilers become overly complex and expensive as the number of pressure levels exceed four.

DESCRIPTION OF CIRCUIT ASSEMBLIES AND CIRCUIT MODULES

Figure 2A:
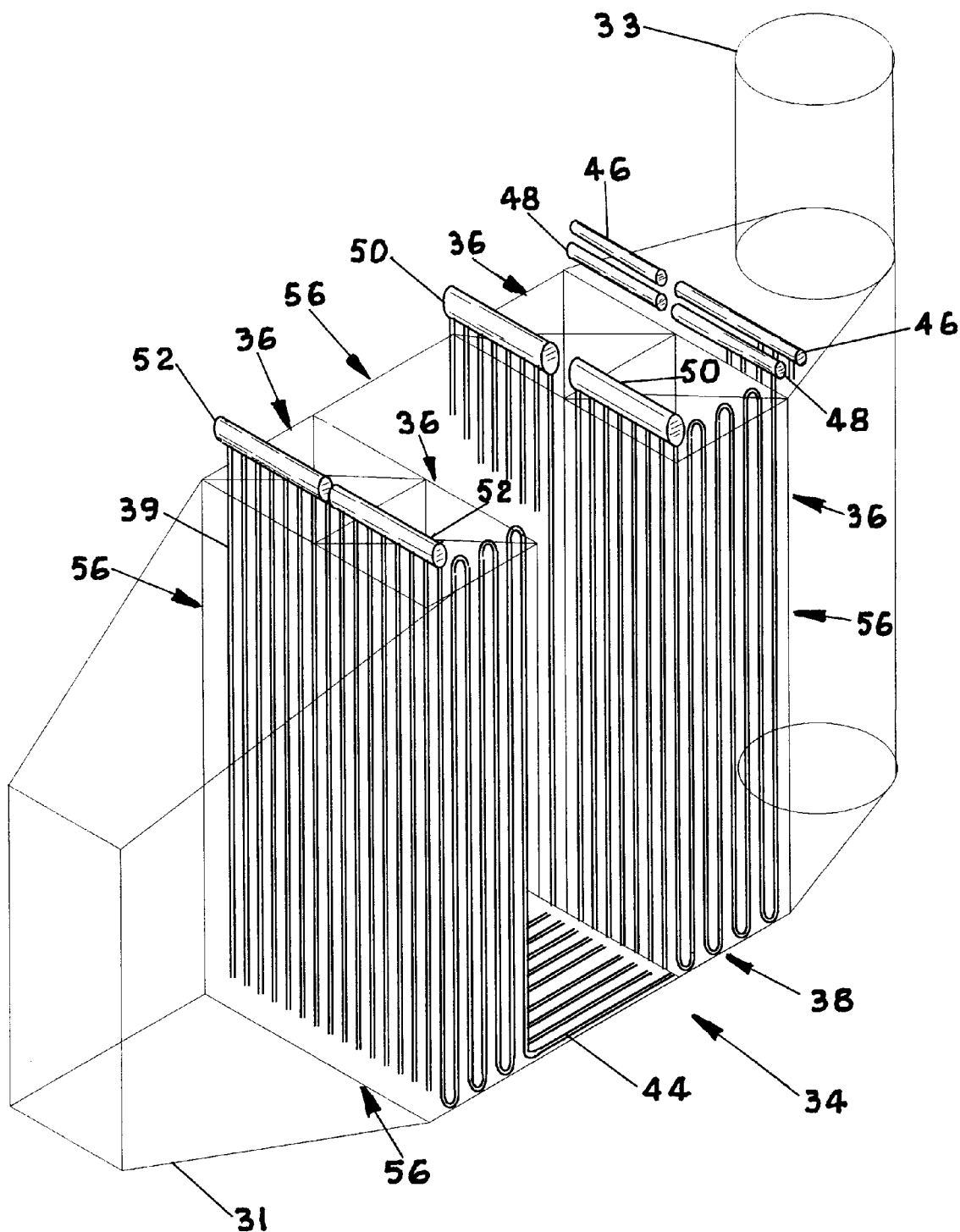
FIG. 2A is an isometric view of a dual pressure boiler module arrangement with vertical tubes erected from four circuit modules.
Figure 2B:
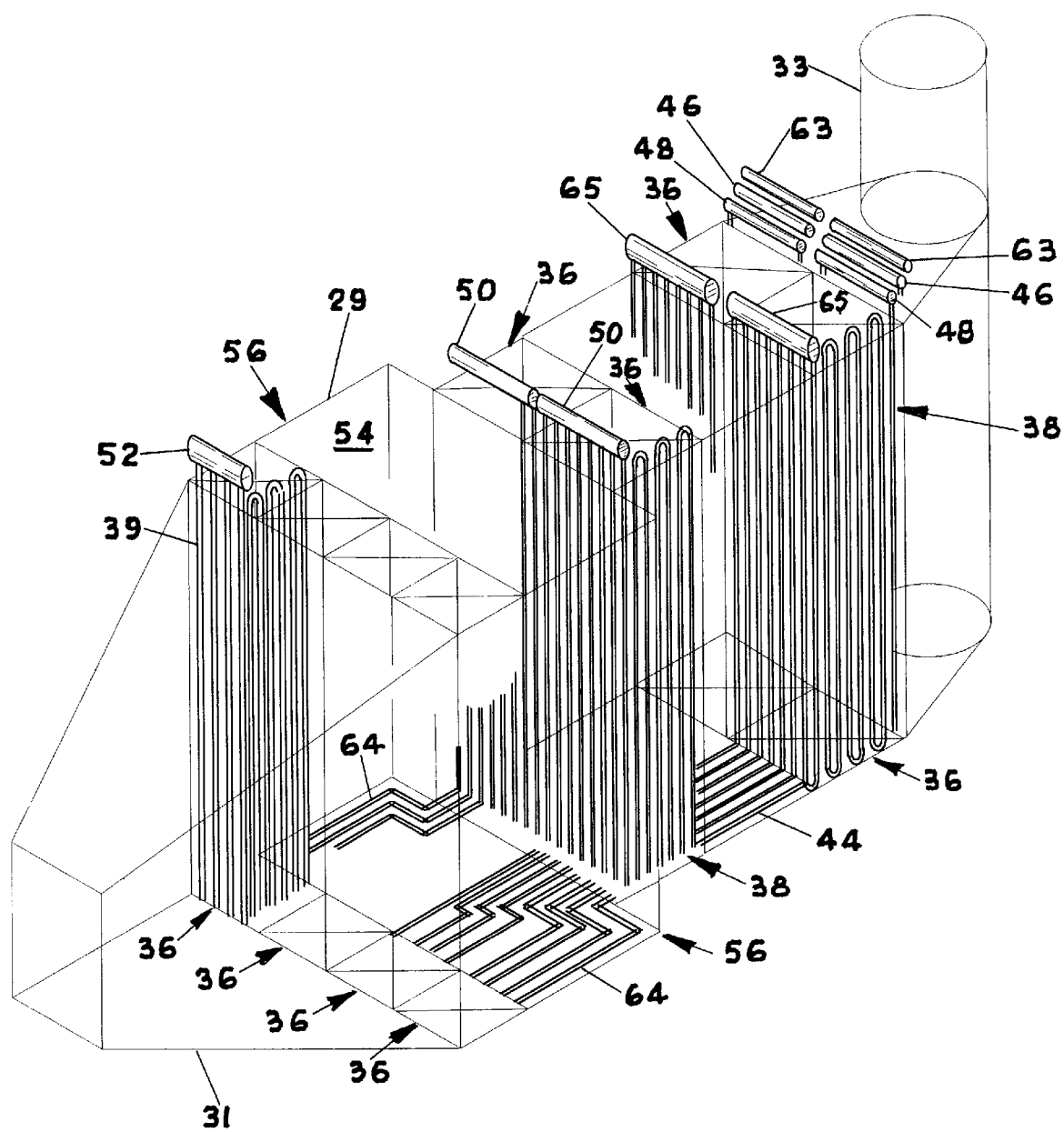
FIG. 2B is an isometric view of a large triple pressure boiler module arrangement with vertical tubes erected from eight circuit modules.

Boiler 24, illustrated in FIG. 1, is a once-through dual pressure gas turbine heat recovery steam generator or boiler. It would be an assembly of thousands of vertical heat transfer tubes. A heat transfer tube 39 is interconnected into circuits at the top and bottom and hung from the top. In the vertical position tube 39 supports its own weight and is free to expand downwards. FIG. 2A illustrates a dual pressure boiler for a medium size gas turbine (100 MW) with about 3,000 fifty foot long tubes. FIG. 2B illustrates a triple pressure boiler for a large gas turbine (150 MW) with about 5,000 vertical heat transfer tubes about 50 feet long.

The heat transfer tube 39 shown in a cutaway view of boiler 24 in FIG. 3, would be a finned tube. Tube 39 would typically be one to three inches in diameter, with four to ten fins per inch and about 20 to 50 feet long. The heat transfer tubes 39 are the main components of a circuit assembly 38. Circuit assembly 38 is the main building block that is stacked in parallel to form a circuit sub-module 35. The circuit sub-module 35 comprises all of the fluid flow tubes and headers enclosed within a boiler casing 56. The header connections are welded in the unfinned section of tubes 39 with a connection weld 76 as the circuit assemblies are horizontally stacked into circuit module 35. All of these connection welds are accessible for machine welding as the module is built by stacking circuit assemblies 38. All heat transfer tubes are contained in boiler casing 56 that directs the flow of gas turbine exhaust gases horizontally through the heat transfer bundles. The casing also insulates against heat loss and prevents gas leakage. The boiler casing 56 includes, the gastight shell structure 29, immediately surrounding the circuit modules, the inlet gas inlet duct 31, the exhaust stack 33, and a insulation system 103. A circuit module 36 is built by integrating the sub-circuit module 35 with at least the upper section of the boiler case's gas tight structure 29 that supports the circuit assemblies when erected. Depending on transportation constraints and the size of the modules, other adjacent sections of the boiler casing's gastight shell structure 29 would also be assembled as part of the circuit module (see FIGS. 4 and 5). Each circuit module 36 is made large to reduce costs, but is usually constrained in size by transportation requirements. Circuit modules 36 are normally the principal components that are fabricated in the shop, and shipped to a site for erection into the once-through boiler 24. Circuit modules are connected together in the field by jumper tubes and external manifolds after erection. For smaller boilers the circuit module would normally comprise the entire boiler casing's gastight shell structure 29. However in some sites, where economic advantages are derived through use of locally constructed boiler casing, the circuit sub-module 35 can be shipped to the site for erection without boiler casing components and mated to the boiler casing in the field.

DESCRIPTION OF METHODS TO CONNECT CIRCUIT ASSEMBLIES AND CIRCUIT MODULES

FIG. 3 illustrates a cross-section of a complete heat transfer bundle assembly 34 made of modules 36 connected in series by a jumper tube 44 for each circuit assembly. Typically from about twenty to over one hundred circuit assemblies would be connected in parallel to complete a heat transfer bundle. In FIG. 3 the connection of two circuit assemblies 38 in series defines an independent dual pressure once-through flow path from inlet to outlet. Feedwater flow is pumped into the inlet end of each circuit and flows in a single serpentine flow path in a counterflow direction to the horizontal hot gas flow. Gas flows from left to right in FIG. 3 while water enters the circuit at the right side. In the initial rows of the circuit the water is preheated. The next rows in the circuit vaporize it to steam and then in the same circuit steam flows into the superheater tubes. The boundaries between the preheater, vaporizer and superheater are not fixed and may move anywhere in the circuit. If the feedwater flow is stopped, the superheater section gets longer and within minutes the entire circuit becomes a superheater, and the circuit is said to be dried. By interspersing headers and tubes in each circuit, two or more pressure levels can be concurrently produced to optimize efficiency of the combined cycle. FIG. 3 shows two pressure levels interspersed in a simple manner, typical of small combined cycles. FIG. 2A illustrates this same dual pressure boiler with heat transfer bundle 34 assembled from four circuit modules 36. In this simple configuration two sets of circuit modules are connected in series to produce steam at high pressure and intermediate pressure. Because of transportation constraints the two series modules cannot be wide enough to accommodate the full gas flow. Thus an identical set of modules is placed in parallel so each is sized to take fifty percent of the hot gas flow.

The circuit assemblies 38 that comprise all the circuit module's heat transfer surface are each connected in series with jumper tubes 44 to functionally provide a dual pressure once-through boiler flow path. In parallel, dozens of identical circuit assemblies connected by the headers become the heat transfer sections of the circuit modules 36. Adjacent circuit assemblies are displaced by one half row to produce a triangular staggered matrix to optimize heat transfer effectiveness. Thus the headers require two banks of tubes to be connected in the outlet steam row (FIG.3).

For larger turbines FIG. 2B illustrates a boiler, of the type herein described, constructed from three different sets of circuit modules 36 connected in series. The preheater circuit modules 36 adjacent to the boiler exhaust stack 33 are connected by jumper tube 44. At the inlet gas duct 31 side the superheated steam circuit modules 36 are constructed with much larger diameter heat transfer tubes than the preheater. As a consequence the combined width of all the circuit assemblies in the superheater sections are much wider. Thus, to be transportable a total of four modules are connected in parallel at the superheater section. In the preheater section with small diameter tubes only two parallel modules 36 are required, to be transportable. A offset jumper tube 64 allows each circuit assembly in each of the circuit modules to complete a once-through flow path from preheater to superheater. In one example (described below) a total of one hundred parallel circuit assemblies are required. Since there are three circuit assemblies 38 in series, a total of three hundred circuit assemblies 38 are required to complete the heat transfer bundle 34. The four module wide superheater section has twenty five circuits per module, and the preheater section with two modules in parallel has fifty circuits per module.

Figure 4:
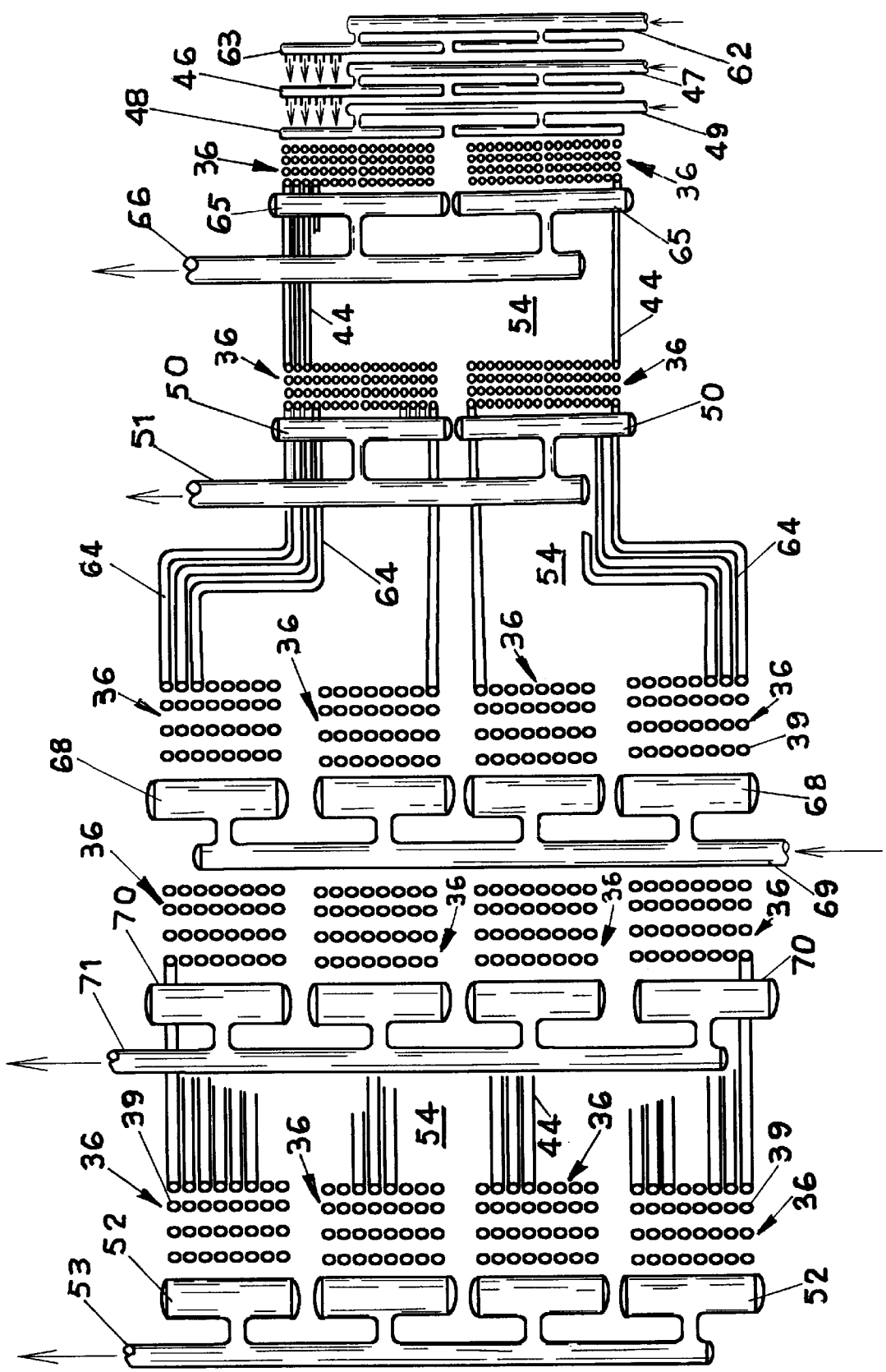
FIG. 4 is a plot plan schematic arrangement of sixteen circuit modules erected to form a large triple pressure boiler with reheat modules, illustrating connections with jumper tubes and arrangement of headers and external manifolds.

In general, the heat transfer bundle 34 may be made of a single circuit module 36 or many circuit modules connected in series, or parallel, or both series and parallel. The size of the turbine, the performance (heat transfer area required) and shipping constraints are the main factors in determining the number of circuit modules 36 needed in a given boiler. For the largest gas turbines FIG. 4 illustrates an arrangement with sixteen modules. This is a triple pressure boiler with reheat sections. This is a schematic plan view of one method connecting five circuit assemblies in series with two and four modules connected in parallel with headers, external manifolds, and jumper tubes. Each circuit module 36 is complete with its feedwater inlet headers, steam headers, or connections to jumper tubes. FIG. 4 illustrates how the circuit module headers are connected to exterior piping by manifolds external to the boiler casing. A vertical pipe, integral to each header, penetrates the upper boiler casing's gastight shell structure 29 through a flexible or sliding seal (FIG. 3) to prevent the escape of exhaust gases. In FIG. 4, a high pressure feedwater header 46 on each preheater module is shown connected to a high pressure feedwater exterior manifold 47. In a similar construction, a intermediate pressure feedwater header 48 on each of the two parallel modules, is connected to a intermediate pressure feedwater exterior manifold 49. And a low pressure feedwater header 63 on each of the two modules is connected to a low pressure feedwater exterior manifold 62. A low pressure steam header 65 on each of two modules is connected to a low pressure steam exterior manifold 66. A intermediate pressure steam exterior manifold 51 is connected to the two intermediate pressure steam headers 50. In the high pressure superheater sections a high pressure steam exterior manifold 53 is connected to four separate high pressure steam headers 52 that are part of the four parallel circuit modules. In this large boiler (FIG. 4) a reheat section is incorporated to provide higher performance from the steam turbine. The reheat circuit module is similar to all the other circuit modules except that it would generally use larger diameter tubes to reduce steam side pressure loss. A reheat steam inlet header 68, one on each of the four reheat modules, connects to a reheat steam inlet exterior manifold 69. A reheat steam outlet header 70, on each of the four reheat steam modules, connects to a reheat steam outlet exterior manifold 71. To allow for thermal expansion differences between headers, manifolds, and circuit assemblies the row of tubes, connected to and supported by the steam headers, is not constrained by the upper strut (see FIG. 15).

The ability to cost effectively utilize large diameter tubes in the superheater and reheater sections permits higher performance than is possible with natural circulation boilers and horizontal tube once through-boilers. Pressure loss in the superheater decreases the temperature difference at the critical pinch point and thus the amount of steam produced. To use a much wider superheater section in a horizontal boiler it would require overly complex hot supporting structure. In natural circulation boilers, a substantial pressure drop is required to distribute steam flow uniformly in the superheater. This is necessary to obtain relatively uniform steam temperature and performance. In a once-through boiler, uniform flow distribution is achieved by an inlet feedwater restriction in each circuit. The superheater section of a once-through boiler, therefore, does not require a pressure drop for flow distribution, and thus can operate with lower pressure (and corresponding temperature) at the critical pinch point when compared to a drum boiler. This results in higher production of steam, or savings in surface area and cost for the same steam production, when compared to conventional designs.

By using circuit modules and jumper tubes, a method of installing conventional horizontal gas flow emissions reduction equipment within the bundle is made simple and practical. More pressure levels could also be added in a similar manner.

DESCRIPTION OF EXEMPLARY ONCE-THROUGH STEAM GENERATOR

Figure 6:
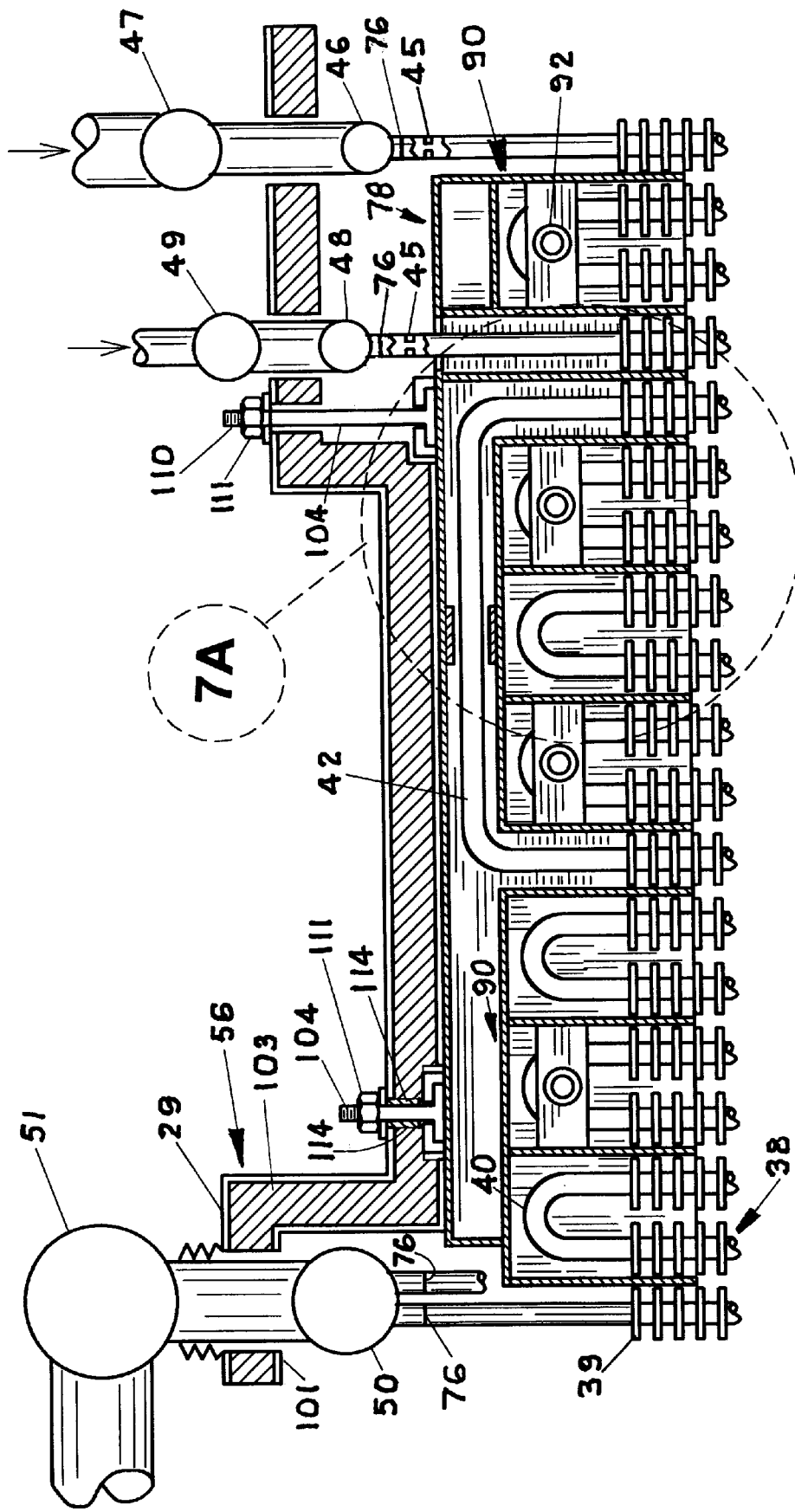
FIG. 6 is an enlarged side view of an upper strut showing the method of attaching hanger rods to the strut.

In one actual boiler for a 1,000 pounds per second air flow gas turbine, in accordance with the principles of the boiler herein described, the heat transfer bundle 34 is made up of eight circuit modules 36 (See FIG. 2B). Each circuit module 36 in this example is fabricated from either twenty five or fifty parallel circuit assemblies 38, providing a total of one hundred once-through parallel water flow paths. Water is uniformly distributed by a flow restriction 45 at the inlet to each circuit assembly 38. In FIG. 6 the flow restriction 45 is shown as an orifice, one of many types of restrictions that can be used. In most boilers, the restriction would be protected by screens at the upstream and downstream sides and would be installed to allow easy access for maintenance. In the example, each circuit assembly 38 is comprised of about thirty rows of heat transfer tubes 39, connected at each end by a U-bend tube 40, or a cross-over tubes 42 to form a serpentine arrangement, as illustrated in FIG. 3. FIG. 3 illustrates a cross section of a boiler with only two different heat transfer circuit modules 36 in series and having only two pressure levels to simplify the drawing. Additional pressure levels would use more cross-over tubes 42, additional circuit modules 38, and headers to intersperse additional pressure levels (as in FIG. 2B).

Twenty five circuit assemblies 38 are used in each of the four parallel circuit modules 36 at the inlet gas duct 31 side. These modules contain one and three quarter inch diameter tubing. These four circuit modules contain the superheater, reheater, and part of the vaporizer. These sections are constructed with large diameter tubes to minimize pressure loss on the steam side, and the corresponding performance loss. The downstream circuit modules 36, at lower gas temperatures, have smaller diameter tubes. With these smaller diameter tubes, circuit modules 36 containing fifty circuit assemblies 38 are also transportable.

The preheater circuit modules have thirty rows of fifty six foot long tubes (with one inch tube diameters), contain fifty circuits and weigh about five hundred thousand pounds. This weight would generally allow transportation to most power plants. The superheated modules, if built with fifty circuit assemblies per module would be too heavy since they use one and three quarter inch diameter thick wall tubing. Thus, these modules are built from twenty five circuit assemblies, each weighing about three hundred and fifty thousand pounds. The exemplary boiler 24 can be erected with fewer than one third the number of heavy lift modules used for conventional drum boilers. If, for ease of transport, only half the weight were allowed, twice as many circuit modules 36 could be assembled with only half the number of circuits. The high flexibility of this approach is provided through use of circuit modules 36 that can be cost effectively interconnected in the field.

The novel boiler's cost effectiveness, plus relative light weight, allows power plant designers to economically add more surface area, and additional pressure levels to thereby increase the system's efficiency. The exemplary boiler (FIG. 2A) weighs about two million pounds, with about two million square feet of heat transfer surface. It contains about seventy miles of finned tubes in the one to two inch diameter range. With conventional natural circulation boilers, two massive drums would be installed on top of the heat transfer bundles weighing about 200,000 pounds. In the once-through boiler without drums, approximately ten percent more heat transfer surface could be added to substitute for the weight of the eliminated drums. This weight and cost savings can be utilized to increase overall efficiency for the same cost. As a consequence, about 200,000 square feet of heat transfer area could be added, for the same boiler cost. This results in about ten percent more surface area and greater steam production. If the extra area could not be effectively used the savings would reduce the cost of boiler construction significantly.

DESCRIPTION OF NOVEL MAINTENANCE SPACE

The basic method to repair all weld joints, tubes, and struts is to shift the damaged or leaking circuit assembly 38 into a maintenance space 54 located between modules (see FIGS. 2A, 3 and 4). The maintenance space is also used for installing the circuit modules in the field after erection. The maintenance space 54 is part of the boiler casing 56 surrounded by the gastight shell structure 29 that also surrounds the tube bundle 34. The circuit assembly 38 is specially arranged allowing it to be connected or disconnected to its adjacent series circuits from within the maintenance space. After erection in the field, a complete circuit module containing thousands of shop-tested weld joints requires only a few dozen machine welded joints for connection to the other module. The connection weld joints 76 join the modules with jumper tubes to a jumper lead tube 43 or directly to a elbow tube 41 at the bottom of the first row of heat transfer tubes in the next module. Location of these welds (see FIG. 3), allows a welding machine to join circuits with connection welds 76 at both ends of each jumper tube during initial installation and subsequent repair. This joint is reachable through hatches in the maintenance spaces for machine welding, inspection, pressure testing and repair to improve the reliability of field welding.

The elbow tubes 41 on the left circuit assemblies 38 (FIG. 3) have freedom in the direction axial to the jumper tube. The heat transfer tube that it connects to is unrestrained in the lower strut. This tube is flexed away from the strut (within the elastic range) to allow thermal expansion of the module and jumper tubes to bring it into its nominal position during operation. This flexibility simplifies weld fit-up of jumper tube connection welds. This freedom coupled with the natural flexibility of long jumper tubes serves to reduce time and cost at installation or during repair and improves the reliability of this important weld.

All header to tube connecting welds are reachable from the maintenance space or inlet duct 31 on the left, or boiler exhaust stack ducting 33 on the right. (For small boilers with only one module, the inlet or exhaust stack ducting would serve as the maintenance space). The tops of tubes 39 are connected to headers at each feedwater inlet row and steam outlet row (see FIGS. 3, 4 and 5). To free the circuit assembly, this bare tube section is cut and the circuit assembly is then free to be rolled out of the module (36). A method to move circuit assemblies 38 into the maintenance space, is important for maintainability. In this location, any of the numerous tubes 39, U-bend tubes 40, or support structure can be repaired, inspected, or replaced with complete access. Located in the walls of the casing 56 are three gas tight hatches, a upper maintenance hatch 58, a lower maintenance hatch 60 and a below jumper tubes maintenance hatch 61. The location of the hatches permits replacement of full-length heat transfer tubes, thus eliminating the problem of having to weld in the finned section of the tubes. The ability to replace full length tubes without cutting adjacent tubes is an important feature to improve weld repair reliability. Weld reliability is poor when dissimilar fin metals or a brazed finned tube is cut and subsequently repaired.

DESCRIPTION OF CIRCUIT ASSEMBLY STRUTS

The manufacturing, transportation, erection and maintenance features described above are achieved by using a upper strut 78 (see FIGS. 3 and 6) with the following functions: a structural support for the tubes, a spacer for tubes at the top of the circuit assembly, the primary gas seal at the top of the circuits to prevent blowby, a shop assembly fixture, a structural support for moving and stacking circuits in the shop, and a shipping constraint during transportation. The upper strut 78 is complemented by a lower strut 80. Strut 80 serves the same functions as strut 78, except it does not hang the tubes and support their weight in operation. The circuit assembly 38 consists of rows of heat transfer tubes 39 connected by welding. Each end of the tube 39 is welded to the U-bend tube 40, the cross-over tube 42, the jumper-lead tube 43, or elbow 41. Welding is simplified by the flexibility of the long tubes 39. They can easily be raised out of the plane of the struts and other tubes. By moving the tubes out of the struts a complete 360 degrees clearance is provided for reliable machine orbital or manual welding. During the welding process, the tubes 39 are not restrained by the struts as they would in conventional tube sheet construction. The elimination of this constraint reduces the time to fit-up and complete a weld. It also eliminates built-in strains between the tube sheets and U-bend tube welds that can cause stress in horizontal boilers.

Figure 9A:
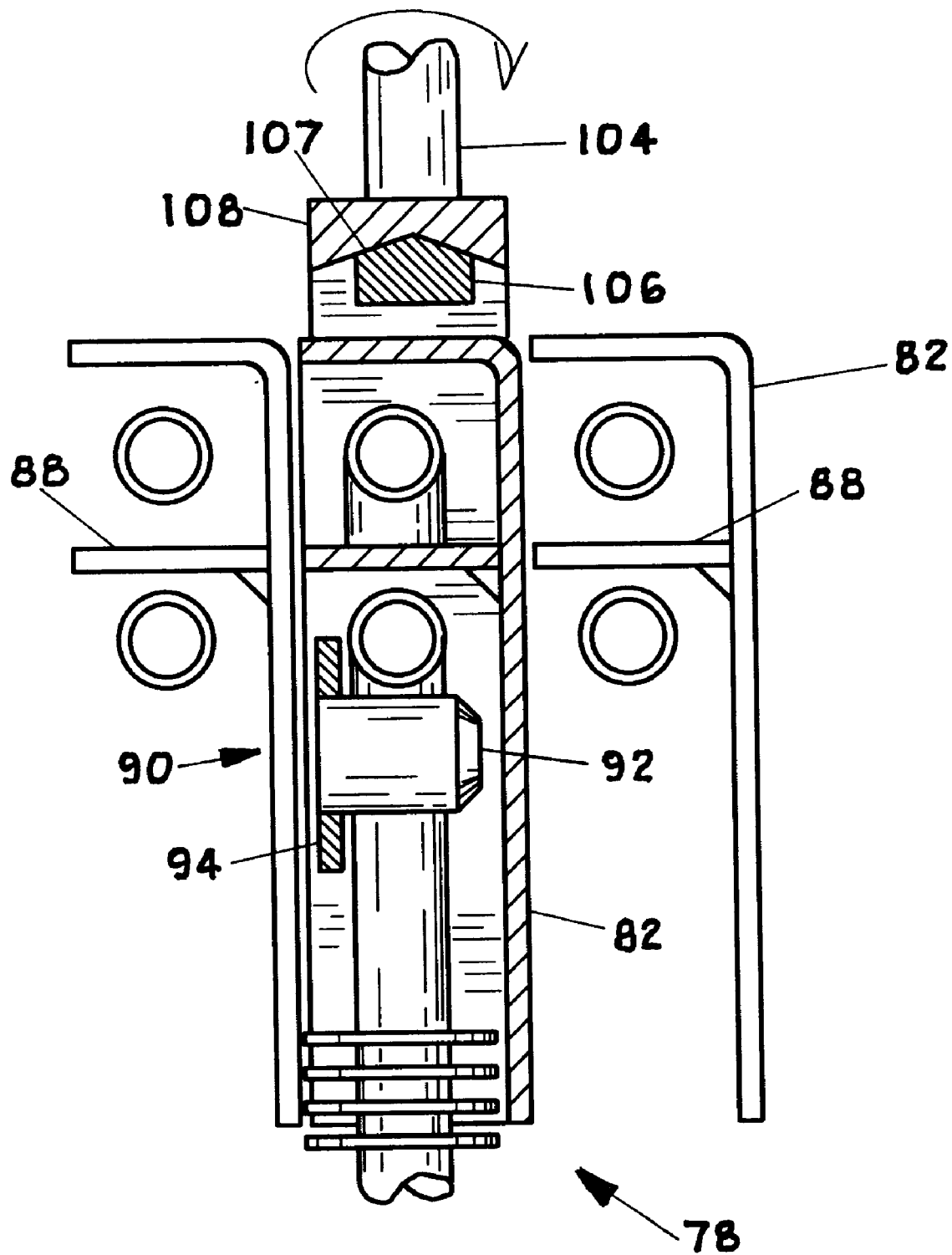
FIG. 9A is a section view of FIG. 7A indicated by section lines 9A—9A showing an end sectional view of the upper strut to hanger attachment.
Figure 9B:
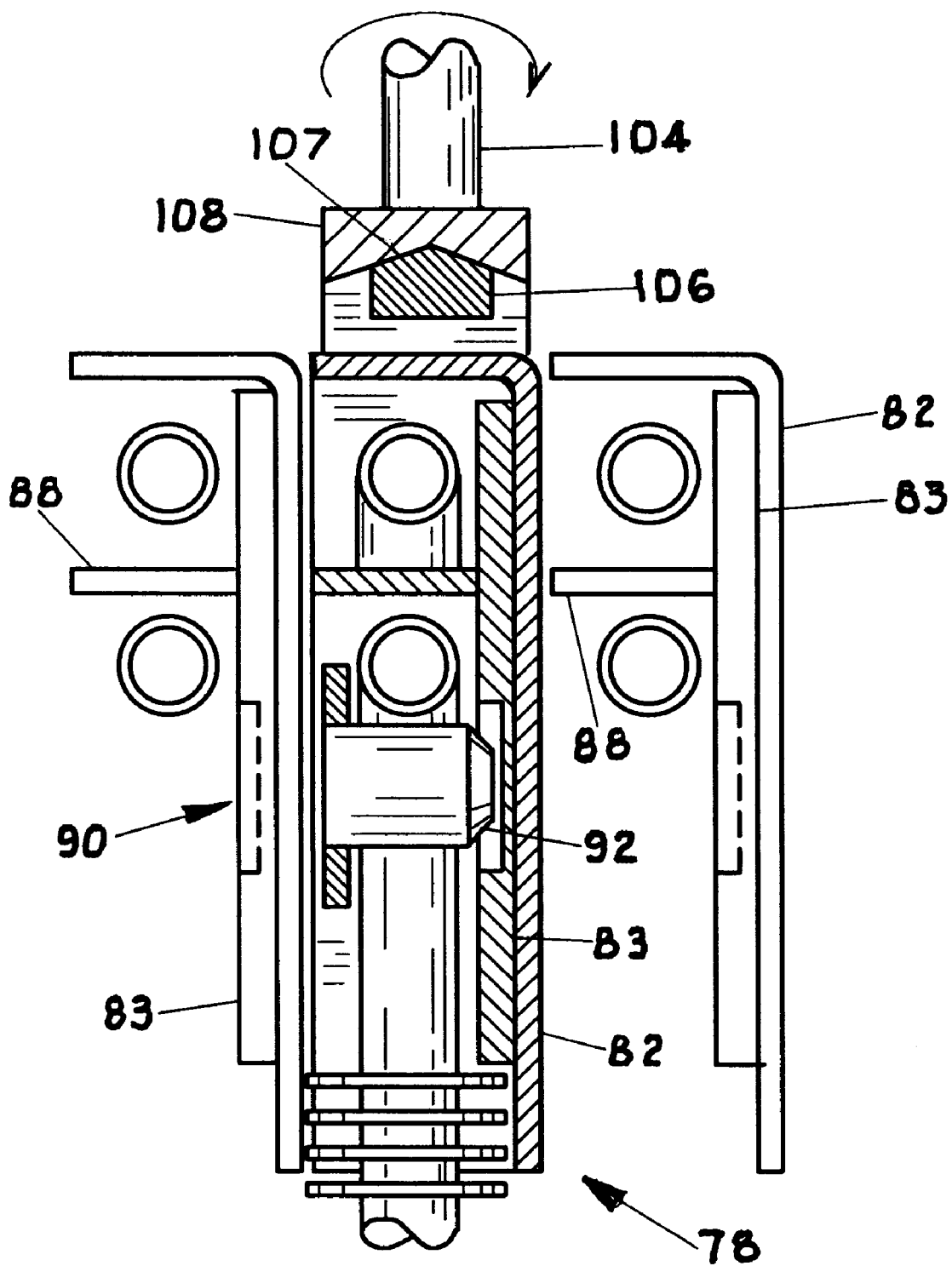
FIG. 9B is the same as view 9A except it shows the addition of a reinforcement.

The backbone of the struts is a strut structural section 82. It provides the primary strength as a support beam. In most boilers the thickness of the strut 82 would be the same as the distance specified between fin tips of adjacent circuit assembly's heat transfer tubes (illustrated in FIG. 7A). This distance is determined by heat transfer calculations for the transverse spacing between tubes. The transverse spacing sets limits to the strut's structural strength and, as a consequence, the circuit weight that the strut can support. If a closer transverse spacing is optimum, the depth of structural section 82 could be increased to gain section strength. Thickness could also be increased by removing fin height locally to increase the strength of the strut, but a more cost effective approach is to vary the thickness of section 82 as shown in FIG. 9B.

Figure 11:
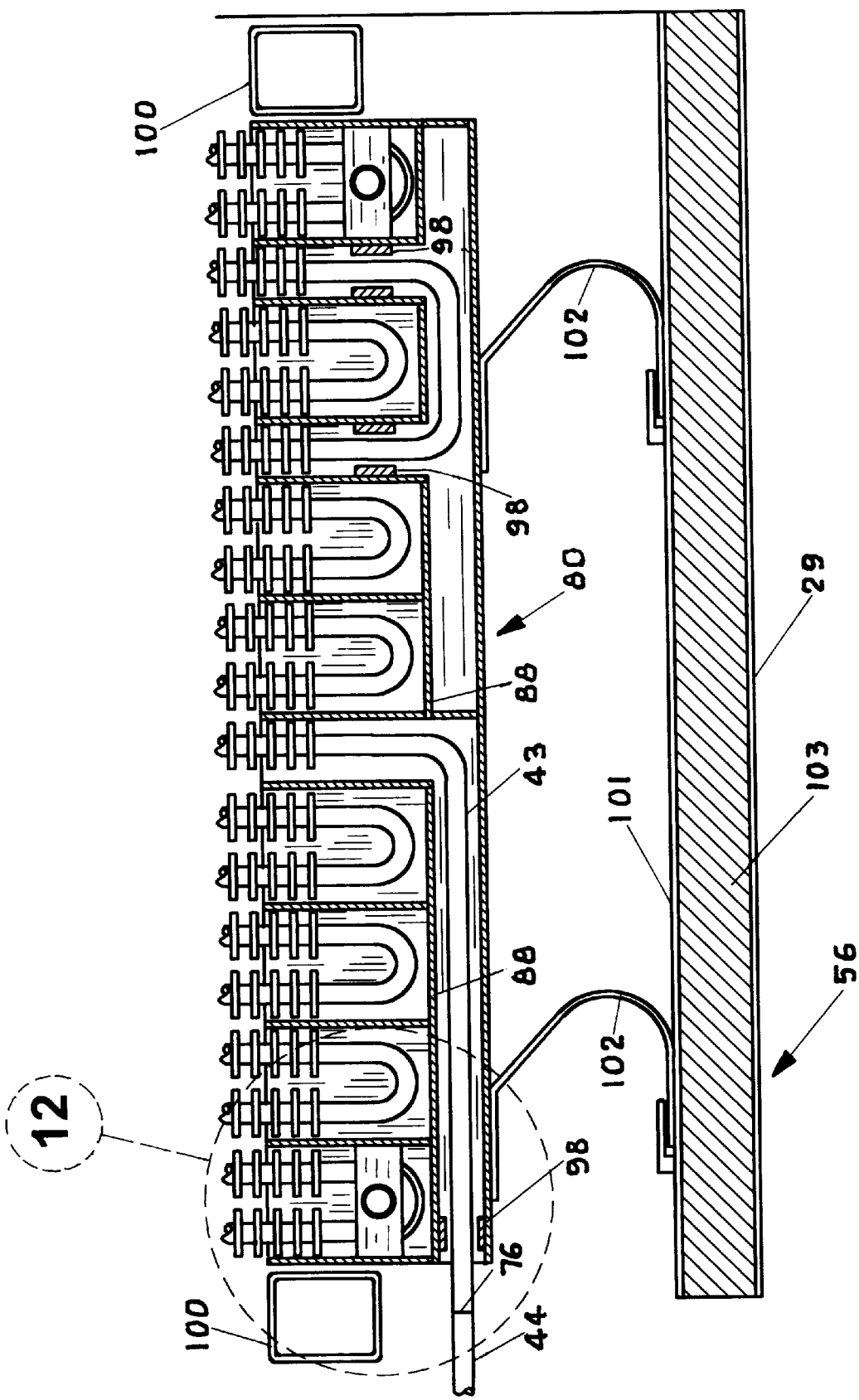
FIG. 11 is an enlarged view of the lower strut and flexible spring seals.

A U-bend tube partition wall 86 (see FIG. 7A) locates the position of the U-bends by retaining them in a compartment. The space in the compartment is slightly greater than the longitudinal dimension across the U-bend tube 40 at the fin tips. The U-bend tube end of two heat transfer tubes is virtually free to flex (the nearest constraint is about ten to twenty feet from the U-bend at the mid-span spacer), therefore only a few pounds of force is required to flex the tubes to position the U-bend in the strut. The partitions also force gas flow across the finned portion of the heat transfer tubes 39 and minimize blowby gas flow. Sealed compartments are also provided for cross-over tubes 42, and jumper-lead tubes 43 with a cross-over tube partition wall 88 and the strut structural section 82. Within these compartments, a split tube seal-support collar 98 is installed (see FIGS. 7A and 7B) to further reduce blowby gas from going around the heat transfer tubes 39. The split collar 98 is made with a circular hole slightly larger than the tube. It is rectangular on the outside to fit into the walls of the compartment and fit against the strut. The inside half is welded into the strut, and the other half installed after the circuit is welded into the strut. It is sized to contact the adjacent strut when installed into module 36, thereby sealing the open space and reducing hot gas blowby. This configuration allows the circuit to be welded with tubes flexed out of the strut and tubes lowered after welding into the struts for horizontal assembly. Seal 98 is positioned to allow cross-over tube flexing for differential thermal expansion and ease of installation. If the cross-over tube is short and not sufficiently flexible to accommodate vertical differential expansion, the split seal can be installed on the bare section of heat transfer tube 39, as shown in FIGS. 3 and 11 (on the short cross-over tube 42, at the bottom of the preheater section).

Struts 78 and 80 are normally custom designed to match the specified performance of different engines and power plants. In addition to their many functions, they also need to be inexpensive to manufacture. In FIGS. 6 and 7, the exemplary struts are shown as weldments made from formed plate stock for 82. Compartment walls are cut from plate stock and welded to complete the strut. Seal partitions are shown to be skip-welded, but a number of different construction methods can also be used to achieve the same objectives of sealing, supporting and spacing. Single piece castings or combinations of stampings and weldments are manufacturing options.

DESCRIPTION OF CIRCUIT ASSEMBLY CONSTRUCTION

The struts when in the horizontal position, are open at the top to allow horizontal bench installation of tubes 39, U-bends, cross-over and jumper-lead tubes, to construct circuit assembly 38. This permits low cost shop assembly, inspection and field maintenance. Tubes can be laid into the appropriate compartments of struts 78 and 80, and into spaces provided in a tube mid-span spacer assembly 116 (FIG. 3). Since long tubes are flexible, the welding can be accomplished in the space above the struts, and the tubes sequentially laid into the appropriate compartment. Ample space for machine or manual welding is provided by this configuration. Space for welding and inspection is an important advantage of the novel circuit assembly 38. In conventional designs, welding space is often very limited and tube alignment a common problem. Proper matching of the two tubes to be welded is critical for reliable welds. Matching the tube ends to welds is difficult in conventional construction using tube sheets. The alignment of heat transfer tubes 39 with the U-bend tubes for welding is hindered by the center-to-center tube sheet hole spacing tolerances. In conventional horizontal tube boilers, forcing tube 39 ends to match an exact U-bend tube 40 center-to-center distance is time consuming and can result in weld joint defects. It can result in excessive friction in the tube sheet and stress in operation. With the boiler herein described, the ends of heat transfer tubes 39 are completely free to align to the U-bend tube's center, and the tubes are not required to slide in operation. This advantage of the novel boiler, although small in detail, can have major benefits in weld quality control, reduced shop labor costs and reduced fatigue stress in operation.

These novel struts and mid-span spacers, when placed vertically along their long axis, are open on the same side for installation of the tubes. Thus the tubes can be inserted horizontally from one side to construct the circuit assembly 38. By using a shop fixture to position the struts and mid-span spacer assembly in a vertical position, the tubes can be assembled as if they were being placed in racks. The long heat transfer tubes, using this assembly method, are placed horizontally into their positions in a ladder-like arrangement. This horizontal orientation of the tube welds simplifies and adds reliability for very large or thick wall tubes that require manual welding or may require heat treatment.

Another advantage of the individual circuit assembly 38, manufactured either on a bench or in a vertical rack fixture, is the ability to hydrostatic leak test and inspect each circuit individually on the shop floor. Thus, all welds in circuit assembly 38 can be thoroughly inspected by many means not applicable in larger structures. More defects can be found and readily fixed. This greater inspection access results in significant reliability gains. When weld reliability is added to the gains in operating reliability derived from reduced frictional loads (see above), the total benefits will be of significant economic impact to the power plant life cycle cost.

DESCRIPTION OF CIRCUIT ASSEMBLY SUPPORT SYSTEM

Figure 7A:
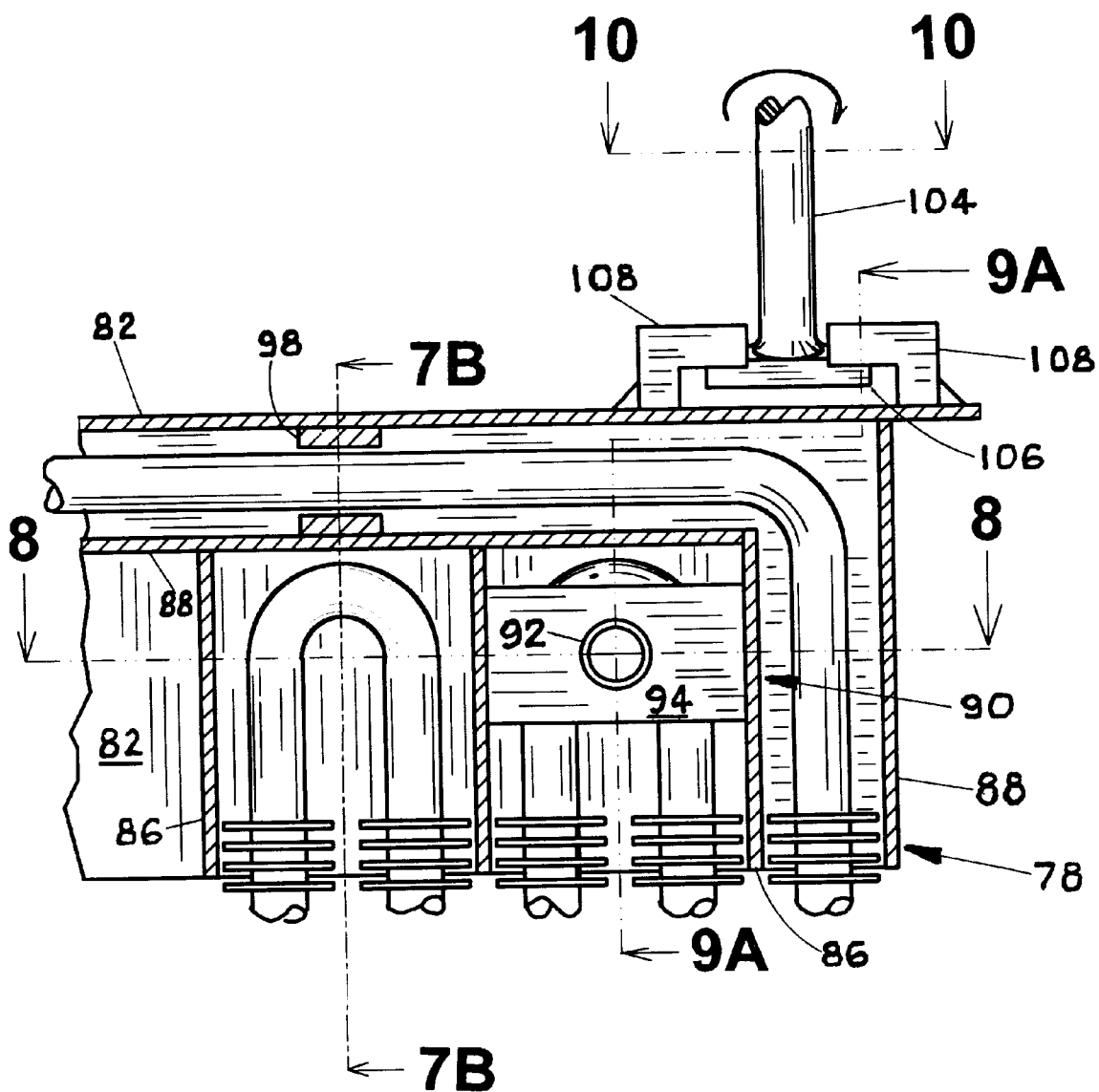
FIG. 7A is the fragment of FIG. 6, identified by reference numeral 7A enclosed within a dashed circle, showing an enlarged view of the upper strut and hanger rod.
Figure 7B:
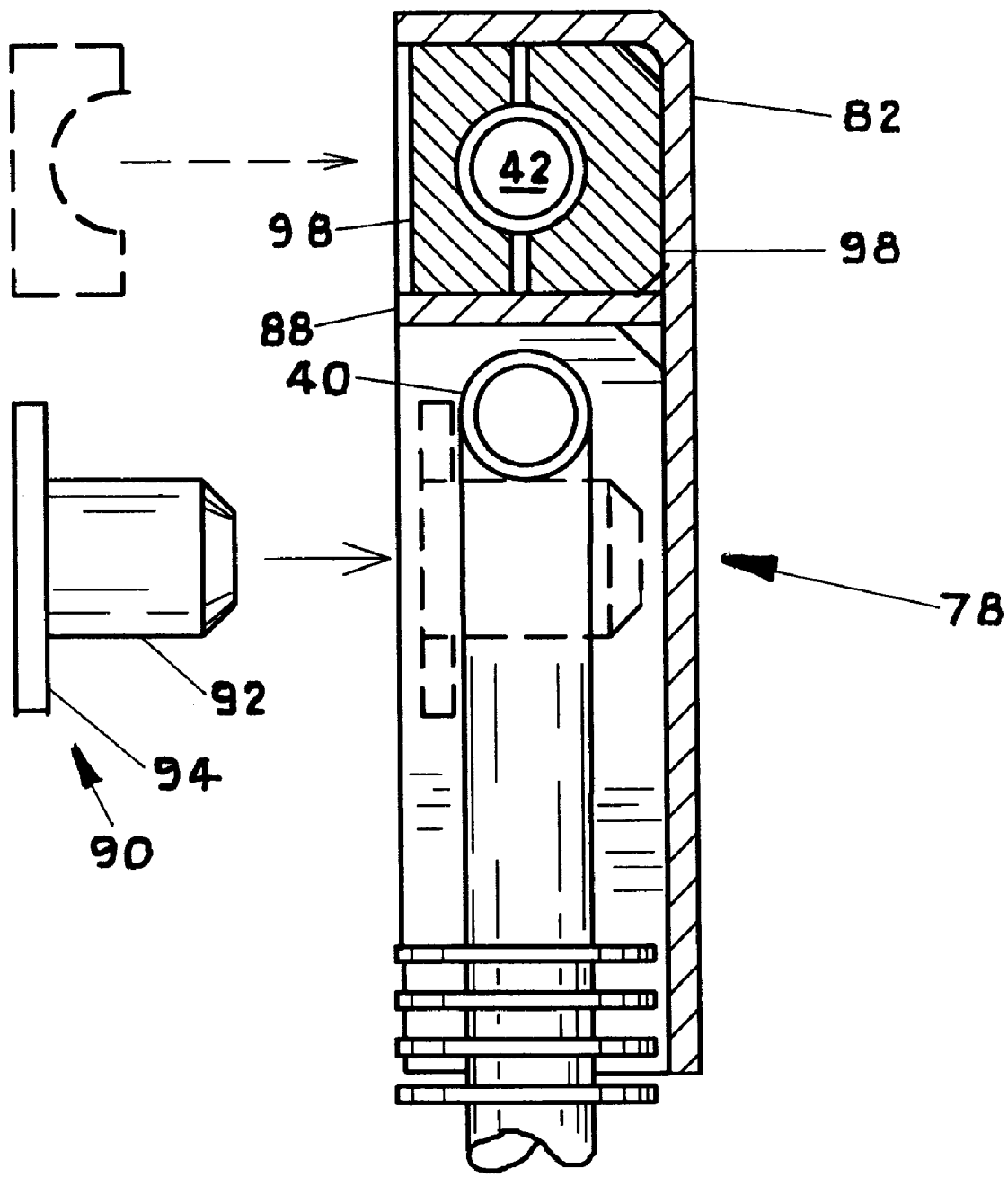
FIG. 7B is a section view of FIG. 7A indicated by section lines 7B—7B showing a split tube seal collar and U-bend tube support assembly with method of installation illustrated with dashed line view of the collar and support assembly.

The weight of the tubes within a circuit module is supported at the upper strut 78 by hanging the tubes from the U-bend tubes. To keep stress in the U-bend tubes 40 within allowable levels, several U-bends must be supported in each circuit assembly 38. Depending on weight and size of the tubes, a support every three to four U-bends may be typical. A unique adjustable method of support provides for uniform distribution of the circuits weight. A U-bend support bracket assembly 90 is a simple adjustable means of attaching tubes to the strut 78. Bracket 90, shown in FIGS. 7A, 7B and 9, has a U-bend support saddle 92 to carry the weight of two or more heat transfer tubes to the strut. FIG. 7B shows how the support bracket is installed after the U-bend tubes have been inserted into their compartments in the struts. It can be made as a weldment, casting, stamping or forging. Round bar stock is shown as the saddle 92 and welded to a base plate 94 as an example of a weldment in FIG. 8. For circuit locations where high loads are calculated for shipping or operation, a U-bend contoured restraint 96 is attached to the bracket 90 (see FIG. 12). This also restrains the circuit assembly and distributes transportation and thermal strain transient loads particularly at the lower strut.

When U-bend tubes are welded onto long heat transfer tubes 39, the location of each U-bend tube may vary considerably from its nominal position. Minimization of U-bend and strut stresses in shipping and operation requires each support point to take its share of the load. Thus, to minimize tube stresses, it is important that bracket support 90 has an adjustment feature to allow it to correctly mate to its U-bend tube 40. Bracket 90 is installed by positioning its support tube surface directly to its mating U-bend tube to locate the bracket for welding. The weld attachment to the strut's 78 partition walls 86 provides a large, linear adjustment along the longitudinal axis of the heat transfer tubes, as shown in FIGS. 7A and 7B. Thus bracket 90 is exactly in the correct position to assume its share of the design load. This eliminates the circuit having to deflect to obtain structural support when erected, or worse not being supported adequately in operation. This arrangement eliminates a major stress problem to tubes since precision location of the U-bend tubes is inherently expensive to control with tubes about sixty feet long. The bracket 90 welds to partition wall 86 are readily accessible for cutting during field repair, if tubes in that row need to be removed. The U-bend bracket 90 is welded into the strut after all the tubes in the circuit have been welded (see FIG. 7B).

DESCRIPTION OF LOWER STRUT

The lower strut 80 typically uses two U-bend brackets 90 (see FIGS. 11 and 12) since the main function of the lower strut is to seal and space the tubes. Typically the brackets would be located at the inlet and outlet gas flow end of each strut. In the example boiler with fifty six foot long tubes, the high pressure superheater, at the gas inlet side 31 has about five inches downward expansion at the final superheater row. At the row adjacent to the maintenance space 54, expansion is about three inches downward. Brackets 90, connected at each end of the lower strut to the two rows with the greatest expansion differentials keep strut 80 in proper angular position for sealing and spacing.

The lower strut 80 permits free rotation of each lower U-bend tube 40. This reduces tube stresses caused by differential expansion between each row of tubes. Restricting rotation can be a common cause of fatigue failure, particularly in superheaters. Strut partition walls are only required to seal and loosely guide the spacing of the matrix in the plane of the U-bend tubes. Thus, a small clearance is maintained between the partition walls and the tube's fin tips to eliminate friction and allow this U-bend to rotate freely. This results in reducing tube stress and loads on the supporting structure. Bending and friction loads in conventional tube sheet supports often result in yield, distortion and failure at this critical section. A similar freedom from end constraints during operation eliminates bending stresses imposed by tube sheet reaction loads on U-bend tubes and heat transfer tubes. This problem is eliminated through the novel strut 80 arrangement. Since each circuit assembly 38 is hung independently, and the strut 80 is independent of adjacent struts, differential expansion between circuit assemblies can be readily accommodated without accumulating damaging stresses. Thus, superheater tubes at different temperatures can operate without high stresses experienced in natural circulation boilers that have pipe headers interconnecting adjacent rows to allow draining.

Another function that is accomplished with the strut 80 is to react forces from seismic shock loads. A boiler seismic beam 100 (see FIG. 3), is located to allow expansion, but limit pendulum like motion of the tube bundles during seismic shock transients. Beams 100 are structurally connected to the boiler case 56 but are easily removable from within the maintenance space. They are removed to permit the circuit assemblies 38 to be rolled out of the circuit module 36 for repair.

Figure 12:
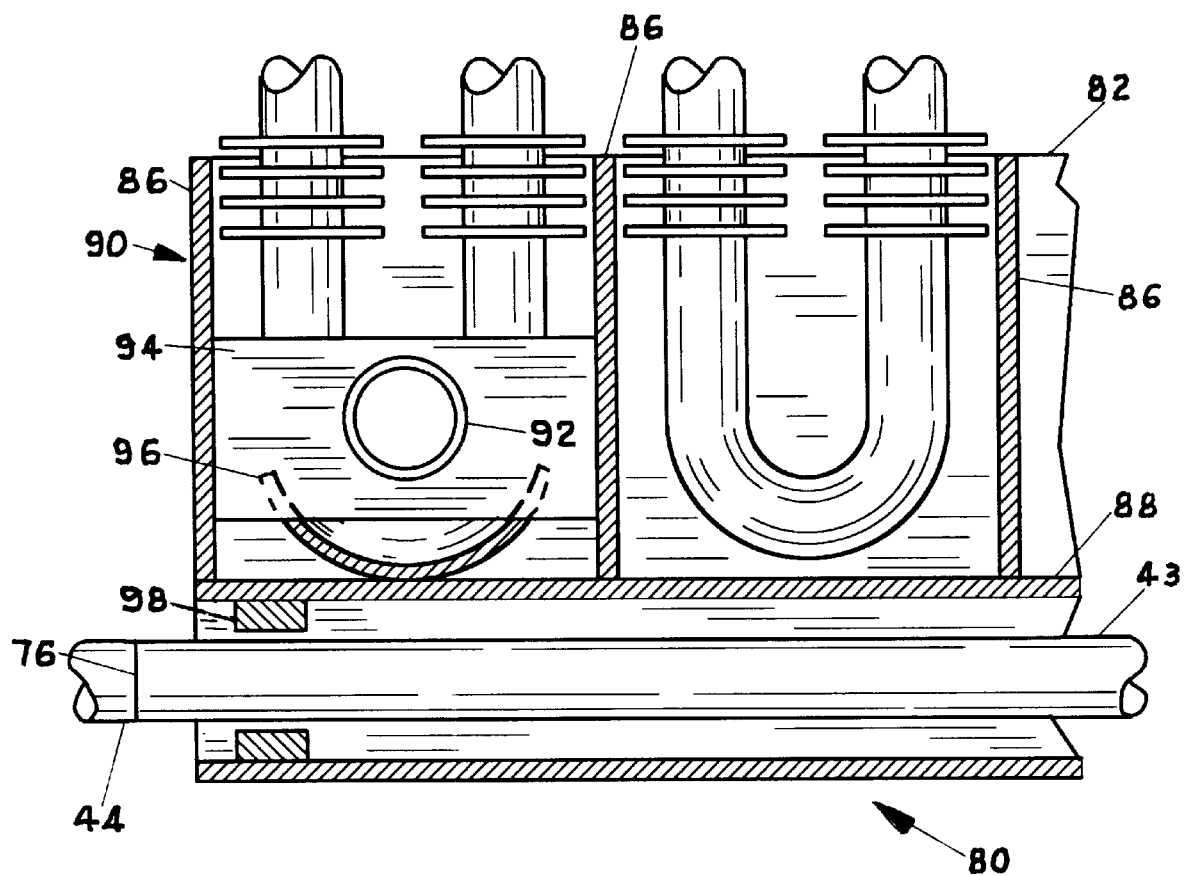
FIG. 12 is an enlarged side view of the lower strut U-bend contoured; restraint, referenced in FIG. 11 by a dashed circle with 12 enclosed within the circle.

A blowby seal 102 is installed between the bottom of strut 80, and a boiler casing inner liner plate 101. They are positioned to restrict by-pass gas flow, while flexing several inches (see FIGS. 3 and 11). The bottom of strut 80 has an "L" shaped flange formed by its strut structural section 82 (FIGS. 9 and 12). The metal liner plates 101, are of conventional overlapping metal plate construction, and are used to protect the insulation system 103, between the liner plate 101, and the cold exterior structure of casing 56 of the boiler. Seals 102 can be made in a number of different configurations. One type of seal would be fabricated of stainless steel sheet metal, bent into a "V", shape (FIG. 11). At higher gas temperatures, they would be made of superalloy sheet metal to allow them to maintain their spring capabilities. For the highest temperatures, articulating plates or pivoting superalloy plates would be installed. They span the entire width of the module. Seals 102, and the adjacent portion of the casing 56, could be assembled as part of the circuit module in the shop to simplify field erection (see FIG. 5). The seals are activated by both spring forces and the differential gas pressure, forcing them into contact with each circuit assembly lower strut 80 and the surface of liner plate 101. For large boilers, they would be made in several overlapping widths to facilitate simple removal and allow for thermal expansion across their width. If a circuit assembly would require removal from the circuit module, the seals 102 would first be unfastened and moved into the maintenance space. The below jumper tubes maintenance hatch 61 is located to allow access to the seals, the bottom of jumper tubes and the bottom of all circuit assemblies.

DESCRIPTION OF HANGER RODS

Top struts 78 are fixed to the cold boiler casing 56 adjacent to the steam header 50 and 52 (see FIG. 3). The end opposite the intermediate steam header 50 is free to expand towards the feedwater inlet in the horizontal plane. In a similar manner, the end of the high pressure circuit module opposite the superheater header 52 is also required to expand freely. The upper strut 78 is fixed in the vertical plane, with expansion heat transfer tubes downward. Thermal expansion space across the stacked width of the circuit modules is created by stacking circuit assembly 38 with a gap between each circuit assembly during construction of the circuit module 36. The gap is made equal to the expansion space needed between circuits in the transverse direction. The gap (about 0.02 inch), is created by a removable spacer 105 (see FIG. 5). Spacers 105 are made of sheet steel stock several feet long and several inches wide and are also used for transportation and removed after erection at the site. Spacer thickness is selected for each circuit module operating temperature.

Figure 5:
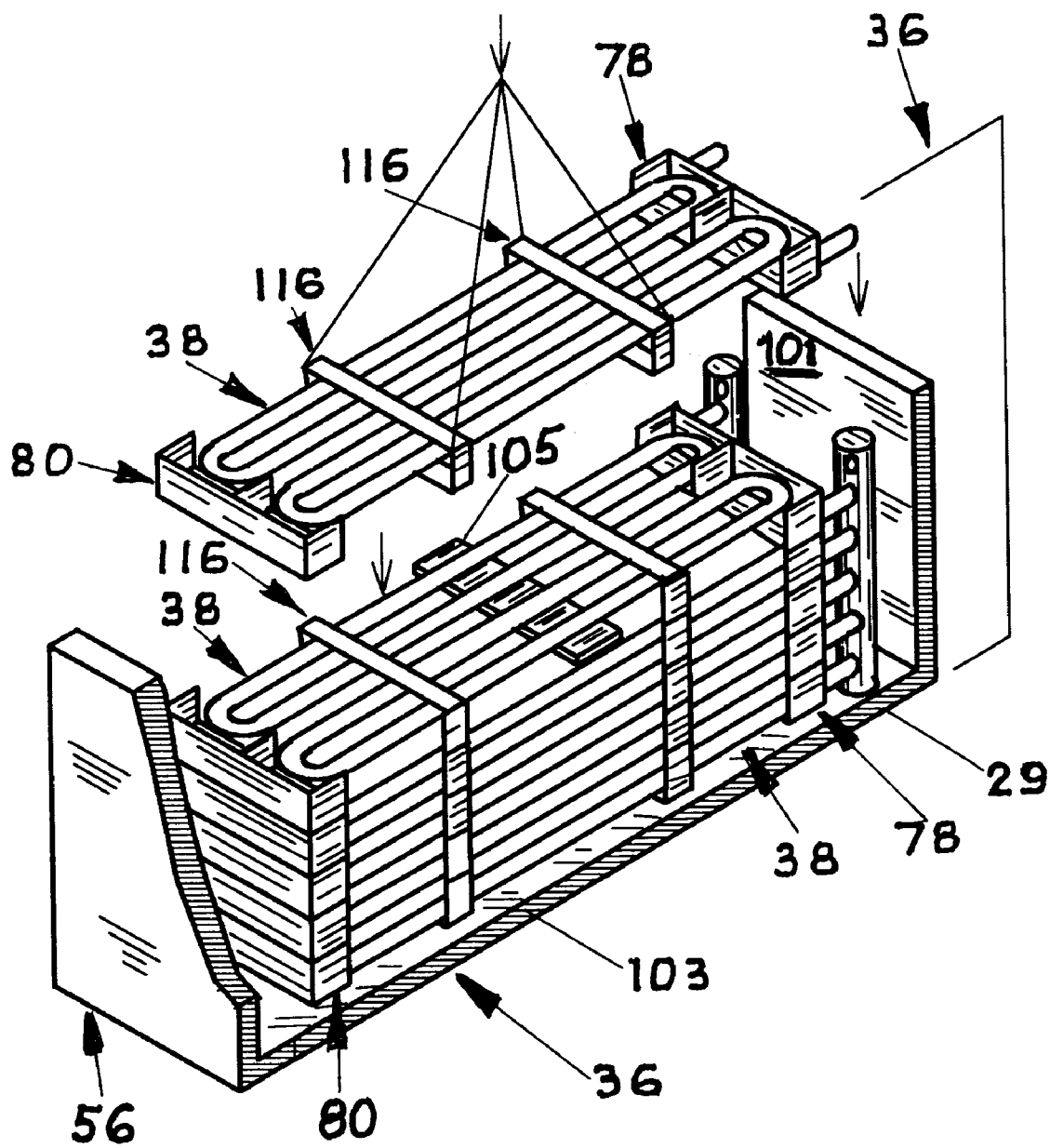
FIG. 5 is an isometric drawing illustrating horizontal construction of a circuit module by stacking circuit assemblies to complete a circuit module.

A hanger rod 104 at each end of upper strut is installed during horizontal stacking of each circuit assembly 38 into circuit module 36, with spacers 105 in place (see FIG. 5). The boiler casing upper section of the gastight shell structure 29 is connected during the horizontal stacking of the circuit assemblies into the module. The need for side wall seals is eliminated by welding the final side wall in place with the removable spacers in place. For boilers 24 that are only one module 36 wide, the other three walls of the gastight shell structure can be welded together in the horizontal shop assembly. For boilers more than a single module wide, the module can be shipped with its adjacent boiler casing gastight shell structure installed to minimize field erection work as illustrated by FIG. 5. It should be noted that in boilers more than two modules wide the middle modules would only be shipped with the upper gastight shell structure and hanging support. Headers are also welded in place in the horizontal shop assembly position with spacers 105 in place to insure proper tube alignment at operating temperatures. Spacers 105 are arranged for easy removal after erection.

A hanger rod 104 at each end of every upper strut supports the weight and locates the position of each circuit assembly. The hanger rods fix the position of the circuit assembly relative to the casing 56 at the steam header end in the vertical and gas flow direction. At the opposite end of the strut 78, hanger rod 104 is designed to flex thereby allowing free expansion of the strut in the horizontal plane. The hanger rods 104 flex to allow the struts at both ends to move freely in the transverse, or stacked, direction of the circuit assemblies 38 (FIG. 5). In the preferred embodiment, the hanger rods flex, however, other methods to allow thermal expansion of the upper strut such as pivoting and sliding joints for the hangers can also allow relatively free expansion. At the hot header end, hanger rod 104 is closely guided by a guide plate 114 on each side (see FIG. 6). The guide plates 114 are fixed to the case, thus fixing the strut 78 to the case, by hanger 104, at the hot header end. At the opposite end or cold end of the strut, a similar hanger rod 104 is made long and flexible without guide plate restraints. Expansion of the strut 78 is allowed by a flexing hanger rod 104. This results in low loads, since the length of the rod 104 is selected to produce a low spring rate in bending flexure. At the end of the module that moves to allow expansion, the tubes are not restrained by the strut. They are pre-flexed out of their normal hot operating position when built in the shop while cold. Thus they flex back into their normal operating position as the modules expands.

Figure 10:
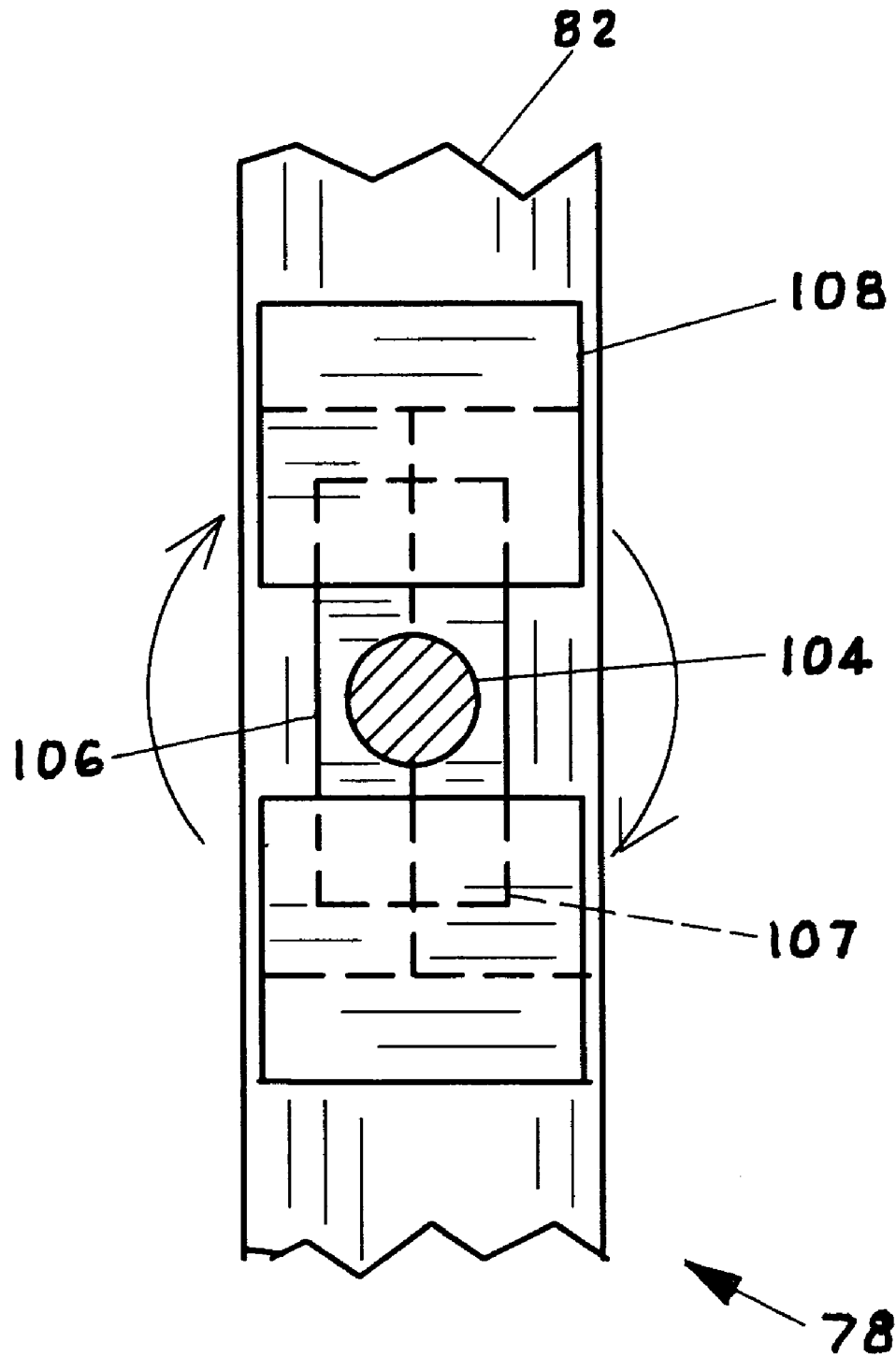
FIG. 10 is a section view of FIG. 7A indicated by section lines 10—10 showing a top view of the hanger rod to upper strut attachment.

The hanger rods 104 have a flange 106 at the lower end that inserts and twists into slots in a hanger slotted block 108 welded to the top of the strut 78 (see FIGS. 7A, 9 and 10). The mating surfaces of the flange 106 and block 108 each have a shallow vee-groove 107 to lock them together when they are loaded. The weight of approximately one half of each circuit assembly 38, is transferred to the cold boiler casing by each hanger rod 104.

At the upper end of hanger rod 104, a threaded connection 110 (FIG. 6) allows individual adjustment of circuit assembly positions during construction of the circuit module. This adjustment permits vertical alignment of each circuit assembly after erection. It is particularly important to ensure alignment of the bottom of each circuit strut 80, to provide a good sealing surface for spring seals 102. An adjustment nut 111 (FIG. 6) on the hanger rod, outside the insulation system 103, transfers circuit module weight to the boiler housing structure. A seal weld, or other gas tight seal, is used to prevent gas leakage and lock this connection. To release a circuit assembly for repair, the seal weld would be cut, and the spring seals 102 locally removed. Tube 39 with weld joint connection 76 to headers would be cut in the unfinned top section. Other connection welds 76 to jumper tubes 44 or elbow tubes 41 would also be cut. Next, the circuit assembly 38 would be lowered a few inches. Using nut 111 on hanger rod 104, the circuit assembly 38 would be lowered and placed on a dolly. This would allow the blocks 108 to clear the insulation liner 101 at the top of the boiler casing. When resting on a dolly, the rods would be rotated ninety degrees to disengage the hanger flange 106 from the slotted blocks 108 (FIG. 10). Rotation out of the centering vee-grove 107 is facilitated since the weight is now resting on the dolly and a vertical clearance is included in the slotted blocks to disengage the flange 106. When clear, the circuit assembly 38 is rolled on the dolly into the maintenance space for repair.

DESCRIPTION OF NOVEL STRUT COOLING

Figure 15:
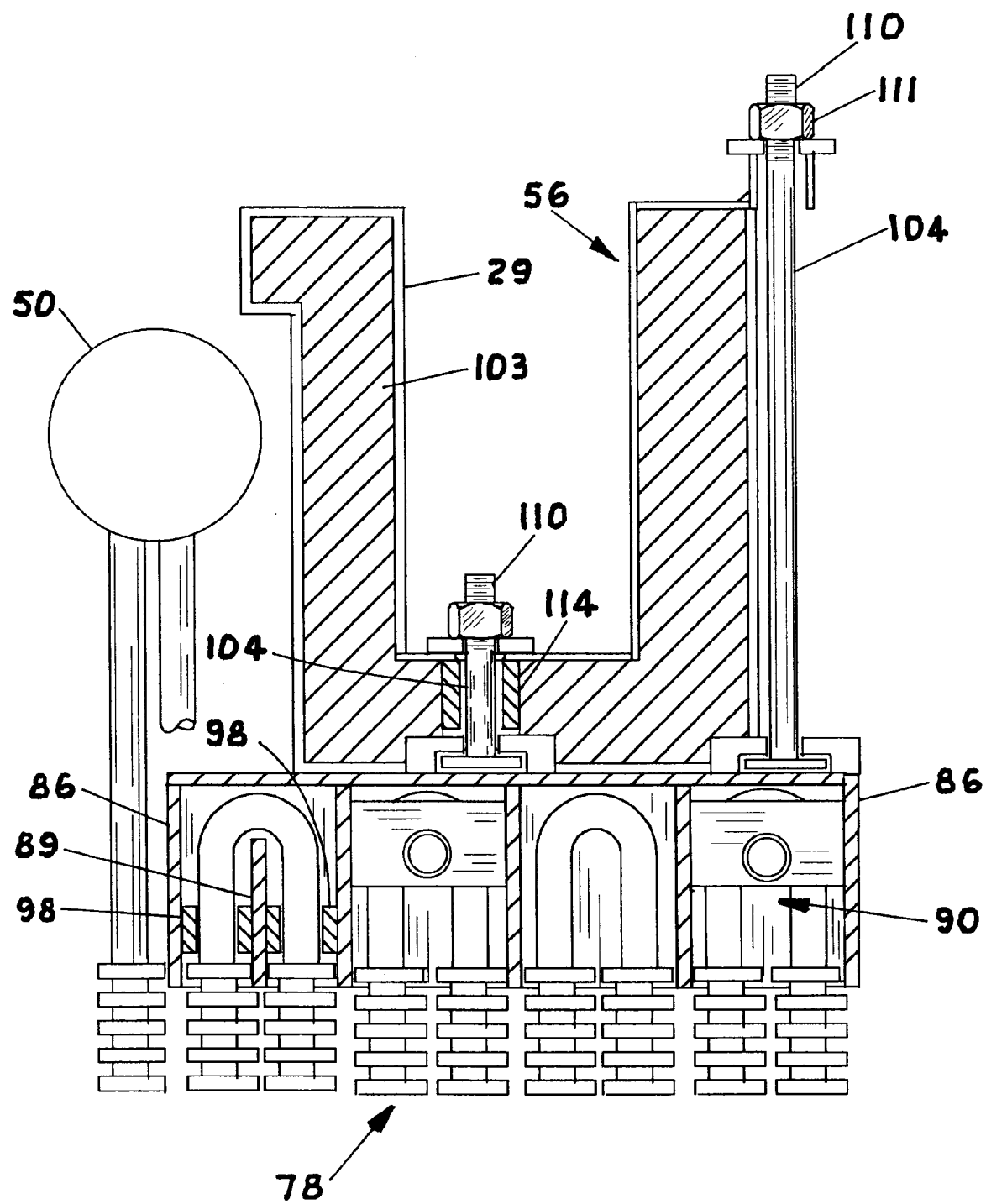
FIG. 15 is a side view drawing of an upper strut with extra tube seal collars to aid in cooling the strut when using high temperature inlet gases.

The novel configuration of the upper strut 78 permits operation at high gas temperatures. With vertical tubes, the header supports the weight of the first couple of tube rows at the gas inlet end. The strut at the header end only has a sealing and spacing function. Thus it has very low stress until it assumes some support of the tube weight (FIG. 15). The high stress area of the strut is further downstream at the first support point where the gas is cooler. Further, the struts 78 and hangers are outside the high temperature gas flow path, gas flow is blocked by the partition walls working as seals to redirect bypass gas flow. These factors allow operation at elevated gas temperatures but have limits that require additional capabilities in the support system for higher temperatures.

To assist in cooling at the high temperature gas inlet rows, bypass leakage is reduced to minimize heating of the strut. This is accomplished by adding a U-bend extra seal partition 89, installed between the two legs of the U-bend tubes (see FIG. 15). Where very high temperature gases enter the boiler (resulting from supplementary firing or high temperature gas turbine exhaust gas) split collars 98, would be added with partition 89. They would be placed around the two legs of the U-bend tube immediately above the top row of fins. They would seal against the top of the fins and the circumference of the bare tube. This would provide additional sealing and cooling to the hottest few rows. The relatively close but sliding fit at these hot locations reduces blowby into the U-bend compartment, thereby reducing convective heating of the strut. The inside walls of the strut are cooled through direct radiation, free convection and direct contact conduction to the relatively cool surfaces of the U-bend tubes and heat transfer tubes. The cool surfaces that are the heat sinks driving the cooling process are typically less than 1050° F.

For higher temperatures, stress at the first hanger location can be reduced by increasing the thickness of the upper strut's structural section 82. FIG. 9A is a cross-section showing that the strut's structural section thickness is constrained to less than the space between adjacent circuits fin to fin tip spacing. The thickness can be increased by opening the spacing between circuits, but this may reduce heat transfer effectiveness. Another means to increase the thickness of the structural section is to add a reinforcement 83 between the U-bend tube and the inside wall of structural section 82 shown in FIG. 9B. It could be welded onto the existing strut along the axial length of the strut. For very high temperature supplementary firing the entire hot gas end of the strut can be constructed from materials capable of high temperature operation. The high temperature materials would be connected to the low alloy on the remaining length of the strut in a cooler temperature section further from the hot gas inlet. Because of the properties of some materials, castings and weldments are both candidate manufacturing methods available for strengthening. Superalloys can have adequate strength to operate at metal temperatures of about 1800° F., depending on the alloy used. Cooling as discussed above will greatly extend the operating temperature range. Addition of thermal barrier coating or other insulation systems can be used to further extend the range above 2000° F. Other cooling methods are also practical, such as using steam or water cooling for hangers but are more expensive and less efficient. High temperature ceramic fiber, refractory insulation, or water cooling of the inlet ducting 31 can be used to protect the inlet ducting, depending upon the temperature of the gas after the burner.

Supplementary firing can be a valuable option to the boiler to add flexibility and match peak power demands at individual sites. It is also a method of matching a combined cycle to an existing power plant site for repowering. The novel boiler herein described is ideal for this service since it can provide cost effectively steam at any temperature and pressure depending upon choice of materials (including supercritical steam conditions). The once-through steam generator is inherently capable of supercritical steam production. The vertical tube arrangement is ideal to support heavy thick walled small diameter tubes required to produce supercritical steam. In a vertical tube boiler the frictional loads on the tubes are eliminated along with buckling loads that cause problems with small diameter tubes.

DESCRIPTION OF TUBE MID-SPAN SPACER ASSEMBLY

Figure 13:
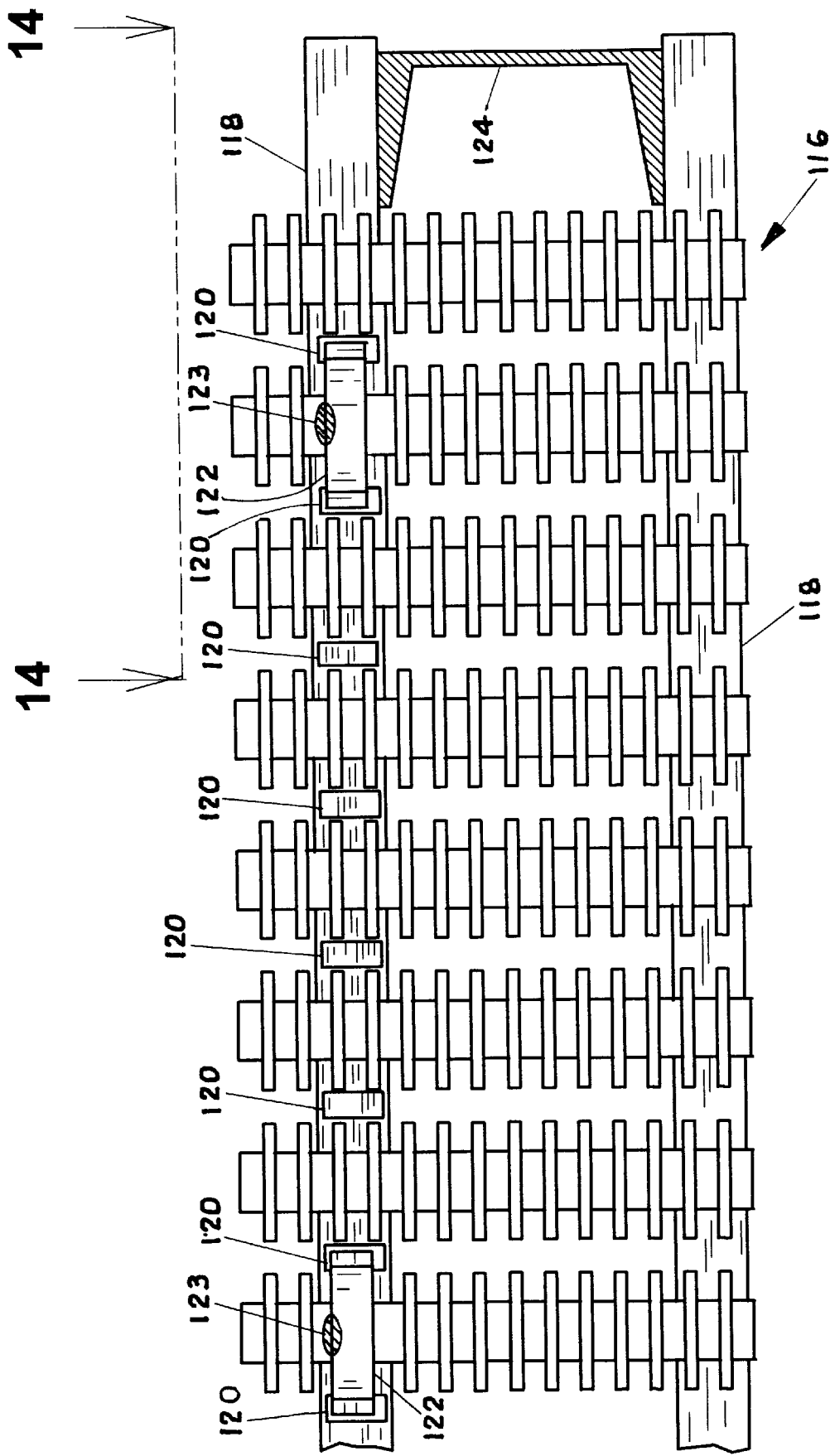
FIG. 13 is an enlarged side view of a tube mid-span spacer assembly.
Figure 14:
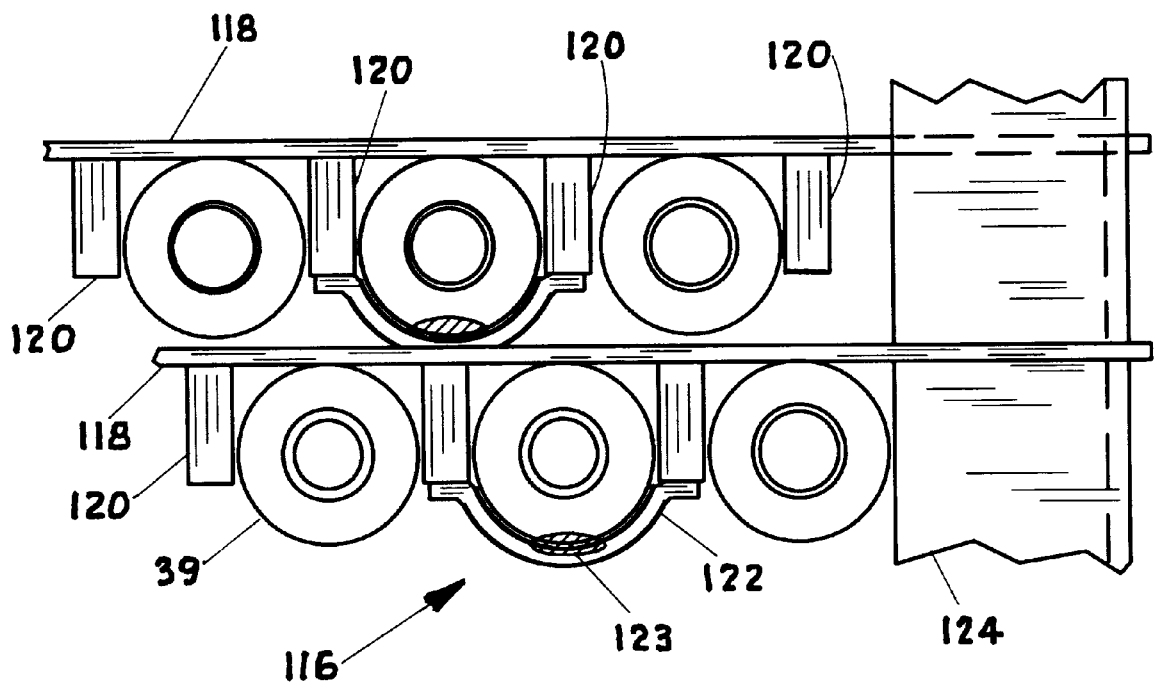
FIG. 14 is a detail top view of FIG. 13 indicated by view lines 14—14 showing a top view of a mid-span spacer assembly.

Although strut 78 is the backbone of each circuit assembly and supports the weight, it only spaces the upper section of the circuits. Since tubes may be more than sixty feet long, additional spacing and vibration damping every ten or twenty feet is necessary, depending on tube diameter. The tube mid-span spacer assembly 116 is used for these functions (FIGS. 3, 13 and 14). These spacers can also be used to support acoustic baffles. They also make up part of the shop assembly fixture of each circuit assembly 38, and can be used in lifting and moving circuit assemblies into position for stacking into modules. The novel configuration of the spacer assembly matches the horizontal assembly features of the struts 78 and 80. Heat transfer tubes 39 are horizontally inserted into 116 spacer assembly between a row spacer 120 that positions each row of tubes. This assembly is done prior to fastening a attachment clamp 122 to the row spacers 120 and the tube The main component of spacer assemblies is a spacer bar 118. It would be the same length as the dimension of the circuit assembly 38 in the gas flow direction. In FIGS. 13 and 14 it is shown fabricated from bar stock. It can also be made in segments, from castings, tubing or stampings. The thickness of the bar between adjacent circuit assemblies 38 is equal to the required gas flow space between each circuit. The row spacer 120, attached to the bar for positioning each row of tubes, is illustrated as a rectangular tube welded to the spacer bar 118 (see FIG. 14). The width of each row spacer 120 is equal to tube row spacing. Their length partially projects beyond the centerline of each tube to provide room for welding the attachment clamp 122 to two adjacent row spacers 120. Clamp 122 is also attached to the fins of tube 39 between the two row spacers 120. An attachment connection 123 to the fins can be welded, crimped, or mechanically fastened. Fastening the clamp is the last step in the construction of circuit assembly 38. Clamp 122 and attachment 123 positions spacer assembly 116 at the proper height when the module is erected. Since the clamps only support the low weight of the mid-span spacer assembly, they are installed at two or three widely separated rows in each circuit assembly. The differential expansion between rows is accommodated by flexing the bar 118 between the clamp locations, or by using a segmented or pivoting spacer bar. The vertical height of the spacer bar 118 is selected to provide a bearing surface for several fins simultaneously, while minimizing the bars section modulus to enable it to flex freely between attachment points 123 on the fins.

Figure 8:
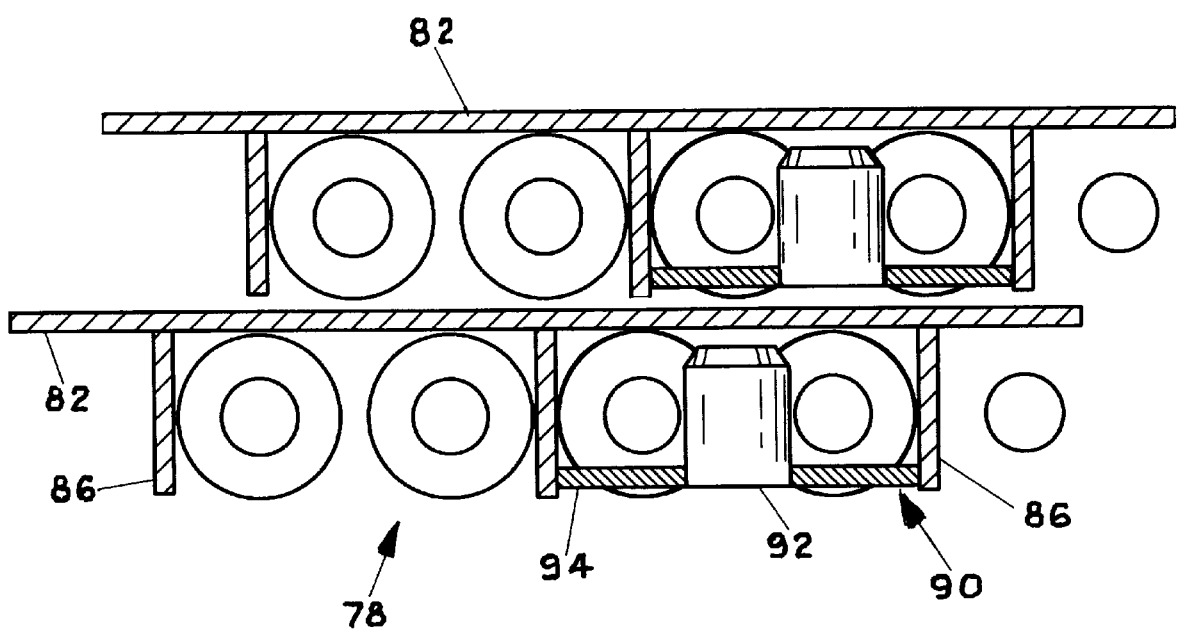
FIG. 8 is a section view of FIG. 7A indicated by section lines 8—8 showing a section of the upper strut illustrating the U-bend support bracket attachment location to the U-bend tube partition wall of the strut.

The ends of spacer bar 118 are connected to a transverse structural beam 124 (see FIGS. 3 and 8). Beam 124 connects the ends of each circuit spacer bar 118 to ensure that all of the circuits are aligned correctly. Beam 124 would normally span across the transverse plane of a circuit module. The beams thermally expand with the tube bundle. The ends of the beams are constrained by guides fixed to the boiler casing 56 side walls that allow expansion but distribute seismic loads and limit transient motion. These mid-span spacers and beams can also be used as a transportation structure. Each adjacent circuit spacer bar 118 is spaced a few inches up or down along the axial length of the heat transfer tube 39. Adjacent spacer bars are attached to the top or bottom of beam 124 to prevent clamp 122 from interfering with the adjacent circuit's spacer bar 118.

TUBE REPAIR AND REPLACEMENT

Rapid repair or replacement of the thousands of welds, tubes or structural components that could fail is critical to maintaining the highest boiler availability. Reliable and fast repair is made possible by the configuration of struts 78 and 80, and the mid-span spacer assemblies 116. Leaking tubes can be isolated to a given circuit assembly by installing temporary partitions between adjacent circuits or other standard methods. To free a circuit from a module, beams 124 are easily removed with full access provided from the maintenance spaces. The hanger system and configuration of the jumper tubes and headers allow the circuit assembly to be shifted into the maintenance space 54 for full access to all tubes and struts. After the circuit assembly 38 is rolled out of circuit module 36 into the maintenance space for repair, most tubes are free to be sprung out of the struts and spacer assemblies for repair or replacement. The tubes restricted by brackets 90 or clamps 122 only require a few small welds to be cut for removal. The tubes and U-bend tubes can be elastically bent out of their struts 78 and 80. In this reachable position, they can be replaced or weld-repaired with space around each weld for machine, or other common welding techniques. Full access to all welds is particularly important for joints that need heat treatment.

OPERATION TO DEWATER VERTICAL TUBE ONCE-THROUGH BOILER

One important requirement for outdoor installations of boilers in a freezing climate is the ability to dewater the boiler or otherwise prevent damage due to freezing. The vertical tube once-through boiler cannot be drained like natural circulation vertical tube drum boilers or horizontal tube once-through boilers. The simplest protection is provided by retaining sensible heat after shut-down. This can be accomplished by maintaining pressure for as long as possible. The installation of a boiler stack closure can greatly extend the time the boiler is kept warm. Heaters can also be installed and turned on when the boiler cools However, in addition to freeze protection, it is often important to dewater and dry a boiler for corrosion prevention. This is particularly important in the case of boilers that use carbon steel and low alloy tubing. A carbon steel once-through boiler can operate many years without significant corrosion or scaling with the full flow demineralizer polishing system 130 (FIG. 1) and proper control of oxygen and pH. Non-operating periods present the primary challenge to preventing low alloy steel tube corrosion. Corrosion is best prevented by draining and drying boilers. Although it is common practice, if freezing is not an issue, to fill the boiler with treated water to reduce corrosion rates, this is not the best method to prevent corrosion. Complete drying and filling with dry nitrogen is ideal.

The novel boiler construction is ideally suited to operate dry. Each circuit is independently supported and allowed to thermally expand downward and away from the fixed headers without constraint from adjacent circuit assemblies. Each heat transfer tube is only connected to the next row by a U-bend tube. Thus, every other row in a circuit is completely free to expand downward. The tubes connected by U-bend tubes can rotate about the U-bend, further reducing restraint during differential thermal transients when the boiler is dried. A boiler constructed from low alloy or carbon steel can be dried of water by running the gas turbine at no-load. At this temperature, (about 500° to 700° F.) the boiler dries out in a few minutes, since it contain low water inventories in tubes within the gastight shell structure 29. The novel boiler structure, high flexibility, expansion allowances and lack of thick drum walls allow rapid heating and drying. In planned system shutdowns, the feedwater flow is stopped and the boiler evaporates all the water to steam. Steam flows through the outlet headers to a steam turbine by-pass line and is sent through a desuperheater and discharged to a power plant condenser 131 (FIG. 1). This procedure not only prevents freezing, but prevents serious corrosion when using carbon steel and other corrosion prone materials. Subsequent purging with dry nitrogen or dry air, and pressurizing above atmospheric pressure, will essentially eliminate all water-side corrosion.

Thus, the preferred shut down is always a short period of dry boiler operation with the gas turbine at reduced or no load. This will completely evaporate all liquid water and prevent freezing damage. However, in the case of a forced shutdown of the gas turbine, a freezing problem could occur. If the turbine cannot be started for many hours, a vertical tube once-through boiler could be damaged by freezing. Heaters could be used as a backup but they do not resolve the corrosion problem. For corrosion prevention, it would be very beneficial to dewater even in warm weather if the turbine could not be operated. Therefore, a novel method of dewatering and drying has been incorporated into the boiler as a backup in case of turbine failures.

When forced shutdown occurs, energy distribution in a vertical tube boiler is normally inadequate to evaporate the water in the boiler's cold end when steam is vented in the normal way through the steam headers. A novel reverse flow system is incorporated in the boiler to dewater the cold water sections, and heat them above 250° F. This system transfers energy stored in hot sections into the cold sections of the boiler, while simultaneously forcing water backwards, out of the circuit assembly tubes into a condenser hotwell 132 (FIG. 1).

Immediately after a forced shutdown of the gas turbine, a system control computer 133 (see FIG. 1), signals the feedwater valves to shut feedwater to the boiler. The steam turbine throttle would be shut. Concurrently, an intermediate pressure steam turbine by-pass valve 142 and a high pressure steam turbine by-pass valve 144 are partially opened if, necessary. The main function of these valves is to ensure that the outlet steam pressure is limited to rated system pressure (to prevent lifting of the safety valves). An intermediate pressure reverse flow valve 134 and a high pressure reverse flow valve 136 are used to dewater the boiler. Valve 134 and valve 137 are installed in an intermediate pressure reverse flow piping system 135 and a high pressure reverse flow piping system 137 that connect the feedwater manifolds to a steam separator 138. Valves 134 and 136 are partially opened to permit high rates of reverse water flow through the flow restriction 45 in each circuit. Valves 134 and 136 are controlled to maintain a programmed schedule of pressure in the boiler. Each boiler would have a programmed pressure versus time function stored in the computer. The computer would control the position of the valves that ensures a rapid rate of dewatering while regulating pressure as a function of time to optimize the process. Water is thus forced backwards through the feedwater headers and lines to the condenser hotwell 132 by steam pressure. The process uses steam generated by water flash evaporating as the pressure is reduced under control of the valves. The computer 133, using appropriate pressure and temperature sensors, controls valves 134 and 136 regulating the rate of water flow from the boiler and thus the steam pressure. Water temperature and pressure immediately downstream of the feedwater headers is measured and, together with the outlet steam pressure in the superheater headers, is transmitted to the computer. The computer 133 calculates the fastest stable rate for purging the water and heating the cold end of the boiler. The major limitation on the rate of water removal is flashing in the flow restriction 45. However, valves 134 and 136 maintain the pressure between the valves and orifices 45 sufficiently high to prevent flashing at flow restriction 45 for most of the process. As pressure is reduced, flashing at the orifices will occur as the remaining hot water is discharged. Valves 134 and 136 are configured and constructed of material to accommodate two phase flow, as would the flow restriction 45. After the water has been purged the feedwater end of the boiler is now heated by the expanding residual steam. At this condition, valves 134 and 136 would be partially opened, and the remaining water would be flashed to steam across the orifices at slightly above atmospheric pressure. When superheated steam is sensed at the feedwater inlet headers, it signals the computer that the valves 134 and 136 can be opened wide to rapidly discharge the steam and heat the tubes. The steam separator 138, a drain to hotwell 140, and a steam from separator piping system 139, closely coupled to valves 134 and 136, provides for separate steam and water return flow to the condenser 131, and condenser hotwell 132.

In multiple pressure boilers, the low pressure boiler, or water heaters, may require high pressure steam to be connected to their outlet headers for complete dewatering and drying. The same process, described above, would be concurrently applied to the lower pressure boiler circuits. When steam generation in the lower pressure circuits drops below the pressure necessary to maintain reverse water flow, high pressure steam is connected to the lower pressure header (or headers) to continue the dewatering. A cross-over valve 146, connecting high pressure steam to the intermediate pressure boiler header, would be opened and controlled by the computer 133 to complete the dewatering process in the lower pressure circuits.

In the exemplary boiler, discussed above, water represents only four percent of the boiler mass. Approximately 6,000,000 BTU are needed to heat the seventeen rows of preheater tubing that are below 212° F. to at least 250° F. The 30,000 pounds of water above 350° F. contain more than 3,000,000 BTU. However, there are 15 rows of tubing in contact with the water that contain more than 15,000,000 BTU of sensible heat energy above a temperature of 300° F. stored in the metal mass of tubing and fins. The energy to maintain evaporation during the reverse flow process is only partially obtained from energy stored in the hot water. Most of the steam is generated from the sensible thermal energy stored in the hot tube walls and fins. This process is continued until most of the original cold water in the preheater is discharged into the condenser and replaced with hot water. Steam is still generated by the hot tube walls that heat and evaporate the water as pressure is reduced. This process efficiently transfers the sensible heat of the tubes upstream in the hotter rows to the cold tubes at the feedwater inlet section. As the hot water interface moves towards the feedwater headers, the pressure continues to fall until all the water is displaced by steam. At the end of this process, superheated steam completes the process by expanding through the inlet headers, further transferring heat from the superheater tubes to the preheater tubes. When the volume of steam is expanded to atmospheric pressure (or the vacuum of the condenser) the coldest tubes are now heated to at least 250° F., no liquid water will remain and subsequent condensation of the small mass of water will not be a freezing problem.

If the shutdown is for an extended period, dry nitrogen or air from a dry gas source 150 would be injected to purge the tubes of moisture vapor after dewatering gas, above atmospheric pressure, is injected through an intermediate pressure gas valve 148, and a high pressure gas valve 149 to purge the tubes of steam vapor. The flow will be opposite the normal steam flow. It is connected to direct gas flow from the steam headers through the tubes and discharged into the feedwater manifolds. The gas can then flow through valves 134 and 136 into the condenser and subsequently vent, or vent directly to the atmosphere with conventional vent lines and valves installed at a high position on each feedwater manifold. The reverse flow of dry gas can be continued until the humidity content of the gas exiting the boiler feedwater manifolds is below the dew point temperature expected during the extended shutdown. Directing gas flow backwards further assists in transferring heat from the superheater tubes to the inlet preheater tubes. This gas purging system is also useful during normal shutdowns to purge moisture vapor remaining in the tubes after dry operation dewatering.

CONCLUSIONS, RAMIFICATIONS, and SCOPE

It is reiterated, in conjunction with the foregoing detail description of the invention, that by the use of the novel construction based on individual circuit assemblies, module arrangements and operating methods, major economies in time and labor may be effected for: shop construction, erection, maintenance, freeze and corrosion protection. In the construction that uses carbon steel tubes the boiler herein described has economic, reliability and operating advantages over all existing drum boilers used in heat recovery. These advantages are derived because: over ninety percent of all welding of pressure parts is completed in bench fabricated and tested circuit assemblies 38; of the simplified method of horizontal stacking of circuit assemblies 38 into transportable circuit modules 36; erection in the field of circuit modules 36 is simplified with reachable jumper tubes 44; and because maintenance is simplified by shifting circuit assemblies 38 into maintenance space 54. As a result, the once-through steam generator herein described allows the numerous advantages of the once-through boilers to be economically used in the largest combined cycle plants.

As the building block for vertical tube boilers, circuit assemblies 38, can be stacked together to produce very large boilers, regardless of the number of pressure levels. This method of fabrication is suitable for repetitive high production techniques where vitually all of the work in constructing large boilers is completed by machine welding on bench assemblies in a shop. Many circuit assemblies can be constructed concurrently. Compared to the conventional once-through boiler, it can reliably be used with the largest gas turbines and is less expensive. The circuit assembly as the basic building block results in high production flexibility. Standard circuit assemblies, or component parts, can be inventoried in the shop for future installation into modules.

A novel dewatering system provides freeze protection in case the gas turbine has a forced shutdown. However, of more importance for vertical once-through boilers, dewatering and drying allows the use of carbon steel and low alloy steel tubes. Dewatering and drying results in major cost savings. By drying the tubes the need for expensive high nickel stainless steel tubes commonly used in conventional once-through boilers is eliminated.

The boiler can operate at higher supplementary firing temperatures than conventional large heat recovery boilers. Its support structure is out of the gas flow path and is cooled by the tubing. Supercritical steam applications become practical with this boiler.

The novel arrangement of circuit modules and offset jumper tubes 64, permits very large diameter tubes in the superheater section, resulting in higher steam production.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

I claim:

1. A once-through boiler comprising:
    (a) A plurality of circuit assemblies, each said circuit assembly comprising: a plurality of vertical heat transfer tubes, a plurality of crossover tubes, and a plurality of U-bend tubes, welded together into at least one independent once-through steam generating serpentine flow path, means for installing said heat transfer tubes horizontally into individual said circuit assemblies in the shop, means for supporting said circuit assembly by hanging, means for transferring the weight of said circuit assembly to the ground, means for spacing said heat transfer tubes for thermal effectiveness, means for sealing said circuit assembly to prevent blowby leakage, means for accommodating thermal expansion of said circuit assembly, means for damping tube vibration, means for dewatering said circuit assemblies, means for repairing said circuit assembly, means for transporting said circuit assemblies horizontally to the field, means for connecting said circuit assemblies in series in the field and thereby providing said boiler with individual preheater, vaporizer and superheater in each once-through flow path, means for interspersing different independent steam pressure flow paths to provide high thermal performance to the boiler with multiple pressure, whereby said boilers with long horizontal gas flow paths, and with a plurality of different steam generating flow paths, can be constructed from said circuit assemblies having widths narrow enough to be transported, (b) a plurality of circuit sub-modules comprising: a plurality of said circuit assemblies stacked in parallel with a plurality of connection weld joints to at least one high pressure feedwater header, and at least one high pressure steam header, (c) a boiler casing comprising: a gas inlet duct, a gastight shell structure around said circuit sub-modules, a boiler exhaust stack, an insulation system, a plurality of blowby seals, whereby hot gas flow is sealed and directed to flow across said circuit assemblies, and whereby said circuit assemblies are supported and blowby loss is minimized, (d) means for effecting the flow of water into said feedwater headers of said circuit assemblies, whereby water as it flows through said circuit assemblies is heated, evaporated to steam by hot gases flowing horizontally across said heat transfer tubes that are vertically positioned in the gas flow path that is directed by said boiler casing from a gas turbine heat source, (e) means for distributing water flow uniformly to the feedwater inlet end of said circuit assemblies to stabilize flow and provide uniform outlet steam temperature from each independent flow path in said circuit assembly, said means for distributing water comprising a flow resistor at the feedwater inlet end of each flow path in said circuit assembly, whereby any size of the boiler can be constructed from said circuit assemblies with most of the welds completed in the shop and a plurality of different pressures can be provided to the boiler and, whereby said circuit asssemblies with long tubes can be transported to the field horizontally for erection into a vertical operating position.

2. A once-through boiler as defined in claim 1 further including a plurality of circuit modules comprising: said circuit sub-modules horizontally assembled with at least the adjacent upper section of said boiler casing's said gastight shell structure, means for supporting said circuit assemblies by hanging also included in said circuit module and the means for supporting is also installed concurrently as said circuit assemblies are stacked and welded to said headers, means for horizontally transporting said circuit modules to the field for vertical erection, and means for connecting said circuit modules in series in the field using a plurality of jumper tubes, whereby field erection time and labor are reduced.

3. A once-through boiler as defined in claim 2 wherein said mentioned means for supporting said circuit assemblies by hanging further includes: means for locating the said circuit assemblies, means for adjusting the vertical position of each circuit assembly individually, and means for accommodating thermal expansion of said circuit assemblies, said means for accommodating comprising: a plurality of hanger rods, means for structurally attaching the lower section of said hanger rods to said upper strut and said rods upper section to said gastight shell structure, means for individually adjusting the vertical height of each said circuit assembly by adjusting the length of said hanger rods, means to locate, center and lock said hanger rods in a specific position relative to said boiler casing, means for assembling said hanger rods in the horizontal position in the shop to said circuit assemblies as they are stacked horizontally adjacent to the upper section of said gastight shell structure, means for disconnecting said hanger rods from said circuit assembly after erection in the field , thereby allowing said circuit assembly to be shifted out of said circuit module for repair, and means for reinstalling said hanger rods back into said circuit assembly after repair, whereby construction, erection, and repair time and labor is reduced.

4. A once-through boiler as defined in claim 1 wherein said means for supporting said circuit assembly by hanging, means for transferring the weight of said circuit assembly to the ground, means for spacing said heat transfer tubes for thermal effectiveness, means for sealing said circuit assembly to prevent blowby leakage, means for damping tube vibration, means for accommodating thermal expansion, and means for installing said heat transfer tubes horizontally into individual said circuit assemblies in the shop, further including means for welding by machine during bench assembly all tube connections of said circuit assemblies, comprise: an upper strut assembly, a lower strut assembly and a plurality of tube mid-span spacer assemblies, said upper strut and said lower strut means for spacing said heat transfer tubes for thermal effectiveness comprise a plurality of partition walls, said tube mid-span spacer assembly means for spacing said heat transfer tubes for thermal effectiveness and damping tube vibration comprise a spacer bar and a plurality of row spacers, said mentioned means for sealing said circuit assembly to prevent blowby leakages comprise said partition walls in said upper strut and said lower strut, and a plurality of split seal collars, said means for supporting said circuit assembly by hanging said circuit assembly comprise a plurality of U-bend supporting means to connect said U-bend tubes to a strut structural section and a means for hanging said upper strut to the said boiler casing, whereby said circuit assembly can be fabricated individually in the shop on a bench by machine welding and then inserting said heat transfer tubes horizontally into the strut compartments formed by said partition walls and said structural section of the struts, and between said row spacers of said tube mid-span spacer assembly, whereby weight of said circuit assembly is transferred to said boiler casing, said heat transfer tubes are properly spaced, gas blowby leakage is prevented, and tube vibration is damped.

5. A once-through boiler as defined in claim 4 further including means for fabricating said circuit assemblies with said heat transfer tubes arranged horizontally in a ladder like configuration, said means for fabricating comprising said upper strut, said lower strut, and said tube mid-span spacer assemblies held in a vertical position along their longitudinal axis wherein spaces formed by said partition walls and said spacer rods create an array of shelf-like spaces, wherein said U-bend tubes and said heat transfer tubes are inserted as the assembly is constructed, whereby time and labor is saved for large said heat transfer tubes.

6. A once-through boiler as defined in claim 4 wherein said plurality of U-bend supporting means to connect said U-bend tubes to said strut structural section further includes means for adjusting said supporting means, whereby weight forces, operating loads and transportation forces will be uniformly distributed and stresses minimized.

7. A once-through boiler as defined in claim 4 further including means for cooling said upper strut by radiation, convection and conduction said upper strut using the relatively cool U-bend tubes and said heat transfer tubes as heat sinks, means for locating the high stress part of said structural section of said upper strut in a cooler zone out of the high velocity hot gas flow path, means for strengthening said upper strut structurally in the hot section, thereby allowing said boiler to be reliably operated at very high inlet gas temperatures.

8. A once-through boiler as defined in claim 1 wherein said boiler is constructed of materials that can reliably operate when said boiler is operated dry and wherein thermal expansion clearances is provided, whereby dry operation can dewater said boiler and thereby provide freeze and corrosion protection.

9. A once-through boiler comprising: said plurality of vertical heat transfer tubes connected together to form a plurality of parallel flow circuits arranged to provide at least one independent once-through steam generating serpentine flow path, said plurality of parallel circuits connected together by said at least one high pressure feedwater header and said high pressure steam header, said boiler casing, said means for effecting the flow of water into said feedwater headers, said means for distributing water uniformly to said parallel flow circuits, said flow resistor located at the feedwater inlet of each said parallel flow circuit and including means for dewatering said boiler using stored thermal energy, said dewatering means comprising: a plurality of reverse flow piping systems connected to each of the feedwater headers, a reverse flow valve in each said pressure reverse flow piping systems, means for stopping the normal steam flow out of the steam headers after the gas turbine fails, means for controlling the flow of steam generated by the stored thermal energy in said boiler from the feedwater headers, and means for connecting said high pressure steam header to the lower pressure steam headers, whereby steam flow can be reversed to dewater and heat said circuit assemblies, whereby freeze protection is provided and corrosion is inhibited when the gas turbine heat source fails even if low alloy steel is used in the water wetted sections of said boiler.

10. A once-through steam generator as defined in claim 9 further including a means for flowing dry gas through said boiler in a reverse flow direction to normal water and steam flow through said circuit assemblies, said means for flowing drugs comprising a dry gas source, a plurality of gas valves connecting said dry gas source to each of the steam headers, means for venting the gas in the feedwater system after it flows through said boiler, and means for isolating and containing the gas in said boiler for an extended period of time, whereby a flow of dry gas is injected in reverse flow through said boiler to displace steam vapor, and heats and dries the cold sections of said boiler using stored thermal energy, and said dry gas is sealed in said boiler for extended periods of time, whereby corrosion in said boiler is prevented thereby allowing the use of carbon steel and other low alloy tubes.

11. A once-through boiler as defined in claim 1 further including means for connecting said circuit assemblies in series when said circuit assemblies have large differences in the diameter of said heat transfer tubes, said means for connecting comprising a plurality of offset jumper tubes, thereby allowing large diameter heat transfer tubes to be used in the superheated sections of said circuit assemblies with reduced steam pressure loss and improved performance.

12. A once-through boiler as defined in claim 1 further including a plurality of maintenance spaces that comprise: a space within said gastight shell structure of said boiler casing, a plurality of hatches, means for connecting with a welding machine said circuit assemblies in the field, means for disconnecting said connection welds on said circuit assembly, means for shifting said circuit assembly into said maintenance space, means for shifting said circuit assembly back into said circuit module, thereby allowing fast and reliable installation of said boiler in the field, and whereby repairs can be reliably completed with access for machine weld repair of all weld joints and replacement of any component of said circuit assembly without cutting tubes in any adjacent said circuit assemblies.

13. A once-through boiler as defined in claim 1 wherein said boiler is constructed with thick walls in all pressure parts and alloy metals in the superheater sections, thereby allowing the generation of any pressure and temperature steam including supercritical steam, whereby thermodynamic performance is improved and said boiler will match all repowering projects on existing steam power plants.

14. A once-through steam generator as defined in claim 1 further including a plurality of additional said heat transfer tubes connected by said U-bend tubes, and a reheat steam inlet header and a reheat steam outlet header to heat steam in independent circuits with at least one different pressure level, whereby higher efficiency is achieved.

\* \* \* \* \*